US012683739B2

(12) United States Patent
Karjalainen et al.

(10) Patent No.: US 12,683,739 B2
(45) Date of Patent: Jul. 14, 2026

(54) ANTENNA-PORT-SPECIFIC REPETITION AND/OR POWER CONTROL

(71) Applicant: Nokia Technologies Oy, Espoo (FI)

(72) Inventors: Juha Pekka Karjalainen, Oulu (FI); Hiromasa Umeda, Tokyo (JP); Mihai Enescu, Espoo (FI); Kyoungmin Park, Seoul (KR)

(73) Assignee: NOKIA TECHNOLOGIES OY, Espoo (FI)

( * ) Notice: Subject to any disclaimer, the term of this patent is extended or adjusted under 35 U.S.C. 154(b) by 303 days.

(21) Appl. No.: 18/565,318

(22) PCT Filed: Apr. 28, 2022

(86) PCT No.: PCT/EP2022/061282
§ 371 (c)(1),
(2) Date: Nov. 29, 2023

(87) PCT Pub. No.: WO2022/268382
PCT Pub. Date: Dec. 29, 2022

(65) Prior Publication Data
US 2024/0267181 A1 Aug. 8, 2024

(30) Foreign Application Priority Data
Jun. 25, 2021 (FI) ..................................... 20215757

(51) Int. Cl.
H04L 5/00 (2006.01)
H04W 52/14 (2009.01)

(52) U.S. Cl.
CPC ............ H04L 5/005 (2013.01); H04L 5/0012 (2013.01); H04W 52/146 (2013.01)

(58) Field of Classification Search
CPC . H04W 72/21; H04W 52/14; H04W 36/0085; H04W 36/0055; H04W 74/0833;
(Continued)

(56) References Cited

U.S. PATENT DOCUMENTS 9,596,065 B2 3/2017 Chen et al.
10,298,377 B2 5/2019 Shin et al.
(Continued)

FOREIGN PATENT DOCUMENTS

WO 2021/012981 A1 1/2021

OTHER PUBLICATIONS

"3rd Generation Partnership Project; Technical Specification Group Radio Access Network; NR; Radio Resource Control (RRC) protocol specification (Release 16)", 3GPP TS 38.331, V16.4.1, Mar. 2021, pp. 1-949.
(Continued)

*Primary Examiner* — Iqbal Zaidi
(74) *Attorney, Agent, or Firm* — Carter, DeLuca & Farrell LLP

(57) ABSTRACT

Disclosed is a method comprising obtaining one or more antenna-port-specific repetition patterns and/or one or more antenna-port-specific uplink power control target values for a plurality of antenna ports; and transmitting an uplink reference signal by applying antenna switching to at least a subset of the plurality of antenna ports based at least partly on the one or more antenna-port-specific repetition patterns and/or the one or more antenna-port-specific uplink power control target values.

1 Claim, 12 Drawing Sheets

| 801 | Identify power imbalance |
| 802 | Determine one or more antenna-port-specific repetition patterns and/or one or more antenna-port-specific uplink power control target values |
| 803 | Indicate the one or more antenna-port-specific repetition patterns and/or the one or more antenna-port-specific uplink power control target values |
| 804 | Receive uplink reference signal |

| 901 | Obtain one or more antenna-port-specific repetition patterns and/or one or more antenna-port-specific uplink power control target values |
| 902 | Transmit an uplink reference signal by applying antenna switching based at least partly on the one or more antenna-port-specific repetition patterns and/or the one or more antenna-port-specific uplink power control target values |

(58) Field of Classification Search

CPC ............... H04W 48/16; H04W 84/045; H04W 36/0022; H04W 36/22; H04L 5/00

See application file for complete search history.

(56) References Cited

U.S. PATENT DOCUMENTS

| | | | |
|---|---|---|---|
| 2018/0368078 A1 | 12/2018 | Vintola et al. | |
| 2019/0253214 A1 | 8/2019 | Liu et al. | |
| 2019/0261281 A1* | 8/2019 | Jung | H04W 52/346 |
| 2019/0349868 A1 | 11/2019 | Zhang et al. | |
| 2020/0028638 A1 | 1/2020 | Liu et al. | |
| 2020/0204316 A1 | 6/2020 | Zhang et al. | |
| 2020/0204407 A1* | 6/2020 | Liu | H04L 27/2607 |
| 2020/0383089 A1* | 12/2020 | Goto | H04L 1/1822 |

OTHER PUBLICATIONS

"3rd Generation Partnership Project; Technical Specification Group Radio Access Network; NR; Physical layer procedures for data (Release 16)", 3GPP TS 38.214, V16.5.0, Mar. 2021, pp. 1-171.

"3rd Generation Partnership Project; Technical Specification Group Radio Access Network; NR; Physical layer procedures for control (Release 16)", 3GPP TS 38.213, V16.5.0, Mar. 2021, pp. 1-183.

"Discussion on additional IL caused by SRS switch", 3GPP TSG-RAN WG4 Meeting #88, R4-1810553, Agenda: 7.6.5.1, OPPO, Aug. 20-24, 2018, 5 pages.

"3rd Generation Partnership Project; Technical Specification Group Radio Access Network; NR; User Equipment (UE) radio transmission and reception; Part 1: Range 1 Standalone (Release 17)", 3GPP TS 38.101-1, V17.1.0, Mar. 2021, pp. 1-513.

"SRS Switching loss impact to system performance", 3GPP TSG-RAN WG4 Meeting #88Bis, R4-1813468, Agenda: 7.6.3.2, Qualcomm Incorporated, Sep. 8-12, 2018, 2 pages.

"Enhancements on SRS flexibility, Coverage and Capacity", 3GPP TSG RAN WG1 #106-e, R1-210xxx, Agenda: 8.1.3, Nokia, Aug. 16-27, 2021, 18 pages.

"FL summary on SRS enhancements", 3GPP TSG RAN WG1 Meeting #102-e, R1-2007076, Agenda: 8.1.3, ZTE, Aug. 17-28, 2020, 39 pages.

"Rel. 17 NR-FeMIMO EVM Offline Discussion", 3gpp tsg_ran/ WG1_RL1/TSGR1_101-e, Agenda: 7.2.6, Docomo, 23 pages.

Office action received for corresponding Finnish Patent Application No. 20215757, dated Jan. 28, 2022, 10 pages.

Invitation to Pay Additional Fees received for corresponding Patent Cooperation Treaty Application No. PCT/EP2022/061282, dated Aug. 12, 2022, 11 pages.

"Discussion of additional SRS symbols", 3GPP TSG RAN WG1 Meeting #98bis, R1-1910141, Agenda: 6.2.3.1.1, Lenovo, Oct. 14-18, 2019, 9 pages.

International Search Report and Written Opinion received for corresponding Patent Cooperation Treaty Application No. PCT/ EP2022/061282, dated Oct. 4, 2022, 19 pages.

* cited by examiner

| TX path | Loss | | Net |
|---|---|---|---|
| | Before Ant | Ant | |
| TX0 to Ant0 | 0 dB | 0 dB | 0 dB |
| TX0 to Ant1 | -3 dB | -3 dB | -6 dB |
| TX0 to Ant2 | -4.5 dB | -9 dB | -13.5 dB |
| TX0 to Ant3 | -7.5 dB | -9 dB | -16.5 dB |

| TX path | Loss | | Net |
|---|---|---|---|
| | TX chain | TX chain to Ant | |
| TX0 to Ant0 | 0 dB | 0 dB | 0 dB |
| TX0 to Ant1 | -3 dB | 0 dB | -3 dB |
| TX0 to Ant2 | 0 dB | -4.5 dB | -4.5 dB |
| TX0 to Ant3 | -3 dB | -4.5 dB | -7.5 dB |

| TX chain | Gain |
|---|---|
| 0 | 0 dB |
| 1 | -3 dB |

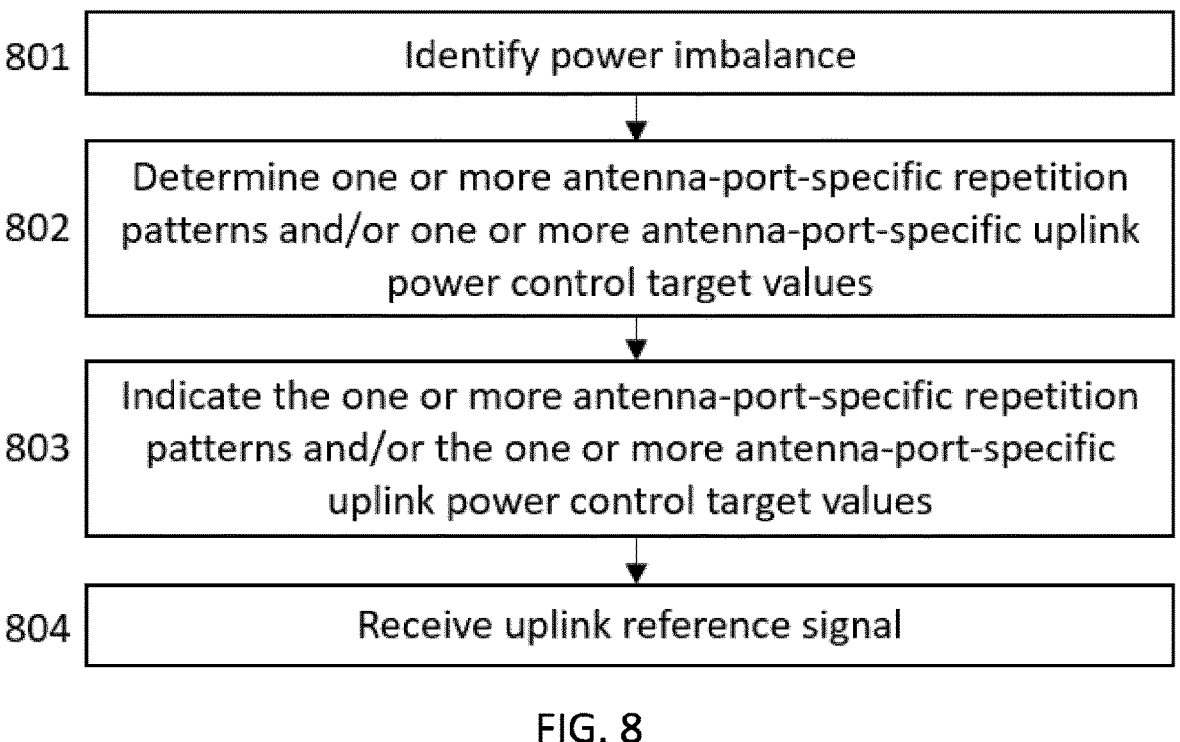

801 | Identify power imbalance

802 | Determine one or more antenna-port-specific repetition patterns and/or one or more antenna-port-specific uplink power control target values 803 | Indicate the one or more antenna-port-specific repetition patterns and/or the one or more antenna-port-specific uplink power control target values 804 | Receive uplink reference signal

FIG. 8

901 | Obtain one or more antenna-port-specific repetition patterns and/or one or more antenna-port-specific uplink power control target values 902 | Transmit an uplink reference signal by applying antenna switching based at least partly on the one or more antenna-port-specific repetition patterns and/or the one or more antenna-port-specific uplink power control target values

FIG. 9

1001 | Perform frequency hopping

ANTENNA-PORT-SPECIFIC REPETITION AND/OR POWER CONTROL

RELATED APPLICATION

This application was originally filed as PCT Application No. PCT/EP2022/061282, filed on Apr. 28, 2022, which claims priority from FI application No. 20215757, filed on Jun. 25, 2021, each of which is incorporated herein by reference in its entirety.

FIELD

The following exemplary embodiments relate to wireless communication.

BACKGROUND

As resources are limited, it is desirable to optimize the usage of network resources. A cell in a cellular communication network may be utilized to enable better usage of resources and enhanced user experience to a user of a terminal device.

SUMMARY

The scope of protection sought for various exemplary embodiments is set out by the independent claims. The exemplary embodiments and features, if any, described in this specification that do not fall under the scope of the independent claims are to be interpreted as examples useful for understanding various exemplary embodiments.

According to an aspect, there is provided an apparatus comprising at least one processor, and at least one memory including computer program code, wherein the at least one memory and the computer program code are configured, with the at least one processor, to cause the apparatus to: obtain one or more antenna-port-specific repetition patterns and/or one or more antenna-port-specific uplink power control target values for a plurality of antenna ports; and transmit an uplink reference signal by applying antenna switching to at least a subset of the plurality of antenna ports based at least partly on the one or more antenna-port-specific repetition patterns and/or the one or more antenna-port-specific uplink power control target values.

According to another aspect, there is provided an apparatus comprising means for: obtaining one or more antenna-port-specific repetition patterns and/or one or more antenna-port-specific uplink power control target values for a plurality of antenna ports; and transmitting an uplink reference signal by applying antenna switching to at least a subset of the plurality of antenna ports based at least partly on the one or more antenna-port-specific repetition patterns and/or the one or more antenna-port-specific uplink power control target values.

According to another aspect, there is provided a method comprising: obtaining one or more antenna-port-specific repetition patterns and/or one or more antenna-port-specific uplink power control target values for a plurality of antenna ports; and transmitting an uplink reference signal by applying antenna switching to at least a subset of the plurality of antenna ports based at least partly on the one or more antenna-port-specific repetition patterns and/or the one or more antenna-port-specific uplink power control target values.

According to another aspect, there is provided a computer program comprising instructions for causing an apparatus to perform at least the following: obtain one or more antenna-port-specific repetition patterns and/or one or more antenna-port-specific uplink power control target values for a plurality of antenna ports; and transmit an uplink reference signal by applying antenna switching to at least a subset of the plurality of antenna ports based at least partly on the one or more antenna-port-specific repetition patterns and/or the one or more antenna-port-specific uplink power control target values.

According to another aspect, there is provided a computer program product comprising program instructions which, when run on a computing apparatus, cause the computing apparatus to perform at least the following: obtain one or more antenna-port-specific repetition patterns and/or one or more antenna-port-specific uplink power control target values for a plurality of antenna ports; and transmit an uplink reference signal by applying antenna switching to at least a subset of the plurality of antenna ports based at least partly on the one or more antenna-port-specific repetition patterns and/or the one or more antenna-port-specific uplink power control target values.

According to another aspect, there is provided a computer readable medium comprising program instructions for causing an apparatus to perform at least the following: obtain one or more antenna-port-specific repetition patterns and/or one or more antenna-port-specific uplink power control target values for a plurality of antenna ports; and transmit an uplink reference signal by applying antenna switching to at least a subset of the plurality of antenna ports based at least partly on the one or more antenna-port-specific repetition patterns and/or the one or more antenna-port-specific uplink power control target values.

According to another aspect, there is provided a non-transitory computer readable medium comprising program instructions for causing an apparatus to perform at least the following: obtain one or more antenna-port-specific repetition patterns and/or one or more antenna-port-specific uplink power control target values for a plurality of antenna ports; and transmit an uplink reference signal by applying antenna switching to at least a subset of the plurality of antenna ports based at least partly on the one or more antenna-port-specific repetition patterns and/or the one or more antenna-port-specific uplink power control target values.

According to another aspect, there is provided an apparatus comprising at least one processor, and at least one memory including computer program code, wherein the at least one memory and the computer program code are configured, with the at least one processor, to cause the apparatus to: identify a power imbalance between a plurality of antenna ports associated with a terminal device; determine, based at least partly on the identified power imbalance, one or more antenna-port-specific repetition patterns and/or one or more antenna-port-specific uplink power control target values for the plurality of antenna ports associated with the terminal device; indicate, to the terminal device, the one or more antenna-port-specific repetition patterns and/or the one or more antenna-port-specific uplink power control target values for an uplink reference signal; and receive, from the terminal device, the uplink reference signal.

According to another aspect, there is provided an apparatus comprising means for: identifying a power imbalance between a plurality of antenna ports associated with a terminal device; determining, based at least partly on the identified power imbalance, one or more antenna-port-specific repetition patterns and/or one or more antenna-port-specific uplink power control target values for the plurality of antenna ports associated with the terminal device; indicating, to the terminal device, the one or more antenna-port-specific repetition patterns and/or the one or more antenna-port-specific uplink power control target values for an uplink reference signal; and receiving, from the terminal device, the uplink reference signal.

According to another aspect, there is provided a method comprising: identifying a power imbalance between a plurality of antenna ports associated with a terminal device; determining, based at least partly on the identified power imbalance, one or more antenna-port-specific repetition patterns and/or one or more antenna-port-specific uplink power control target values for the plurality of antenna ports associated with the terminal device; indicating, to the terminal device, the one or more antenna-port-specific repetition patterns and/or the one or more antenna-port-specific uplink power control target values for an uplink reference signal; and receiving, from the terminal device, the uplink reference signal.

According to another aspect, there is provided a computer program comprising instructions for causing an apparatus to perform at least the following: identify a power imbalance between a plurality of antenna ports associated with a terminal device; determine, based at least partly on the identified power imbalance, one or more antenna-port-specific repetition patterns and/or one or more antenna-port-specific uplink power control target values for the plurality of antenna ports associated with the terminal device; indicate, to the terminal device, the one or more antenna-port-specific repetition patterns and/or the one or more antenna-port-specific uplink power control target values for an uplink reference signal; and receive, from the terminal device, the uplink reference signal.

According to another aspect, there is provided a computer program product comprising program instructions which, when run on a computing apparatus, cause the computing apparatus to perform at least the following: identify a power imbalance between a plurality of antenna ports associated with a terminal device; determine, based at least partly on the identified power imbalance, one or more antenna-port-specific repetition patterns and/or one or more antenna-port-specific uplink power control target values for the plurality of antenna ports associated with the terminal device; indicate, to the terminal device, the one or more antenna-port-specific repetition patterns and/or the one or more antenna-port-specific uplink power control target values for an uplink reference signal; and receive, from the terminal device, the uplink reference signal.

According to another aspect, there is provided a computer readable medium comprising program instructions for causing an apparatus to perform at least the following: identify a power imbalance between a plurality of antenna ports associated with a terminal device; determine, based at least partly on the identified power imbalance, one or more antenna-port-specific repetition patterns and/or one or more antenna-port-specific uplink power control target values for the plurality of antenna ports associated with the terminal device; indicate, to the terminal device, the one or more antenna-port-specific repetition patterns and/or the one or more antenna-port-specific uplink power control target values for an uplink reference signal; and receive, from the terminal device, the uplink reference signal.

According to another aspect, there is provided a non-transitory computer readable medium comprising program instructions for causing an apparatus to perform at least the following: identify a power imbalance between a plurality of antenna ports associated with a terminal device; determine, based at least partly on the identified power imbalance, one or more antenna-port-specific repetition patterns and/or one or more antenna-port-specific uplink power control target values for the plurality of antenna ports associated with the terminal device; indicate, to the terminal device, the one or more antenna-port-specific repetition patterns and/or the one or more antenna-port-specific uplink power control target values for an uplink reference signal; and receive, from the terminal device, the uplink reference signal.

According to another aspect, there is provided a system comprising at least a terminal device and a base station. The base station is configured to: identify a power imbalance between a plurality of antenna ports associated with the terminal device; determine, based at least partly on the identified power imbalance, one or more antenna-port-specific repetition patterns and/or one or more antenna-port-specific uplink power control target values for the plurality of antenna ports associated with the terminal device; transmit, to the terminal device, an indication indicating the one or more antenna-port-specific repetition patterns and/or the one or more antenna-port-specific uplink power control target values; and receive, from the terminal device, an uplink reference signal. The terminal device is configured to: receive, from the base station, the indication indicating the one or more antenna-port-specific repetition patterns and/or the one or more antenna-port-specific uplink power control target values; and transmit, to the base station, the uplink reference signal by applying antenna switching to at least a subset of the plurality of antenna ports based at least partly on the one or more antenna-port-specific repetition patterns and/or the one or more antenna-port-specific uplink power control target values.

According to another aspect, there is provided a system comprising at least a terminal device and a base station. The base station comprises means for: identifying a power imbalance between a plurality of antenna ports associated with the terminal device; determining, based at least partly on the identified power imbalance, one or more antenna-port-specific repetition patterns and/or one or more antenna-port-specific uplink power control target values for the plurality of antenna ports associated with the terminal device; transmitting, to the terminal device, an indication indicating the one or more antenna-port-specific repetition patterns and/or the one or more antenna-port-specific uplink power control target values; and receiving, from the terminal device, an uplink reference signal. The terminal device comprises means for: receiving, from the base station, the indication indicating the one or more antenna-port-specific repetition patterns and/or the one or more antenna-port-specific uplink power control target values; and transmitting, to the base station, the uplink reference signal by applying antenna switching to at least a subset of the plurality of antenna ports based at least partly on the one or more antenna-port-specific repetition patterns and/or the one or more antenna-port-specific uplink power control target values.

BRIEF DESCRIPTION OF THE DRAWINGS

In the following, various exemplary embodiments will be described in greater detail with reference to the accompanying drawings, in which

FIGS. 8-10 illustrate flow charts according to some exemplary embodiments;

DETAILED DESCRIPTION

The following embodiments are exemplifying. Although the specification may refer to "an", "one", or "some" embodiment(s) in several locations of the text, this does not necessarily mean that each reference is made to the same embodiment(s), or that a particular feature only applies to a single embodiment. Single features of different embodiments may also be combined to provide other embodiments.

In the following, different exemplary embodiments will be described using, as an example of an access architecture to which the exemplary embodiments may be applied, a radio access architecture based on long term evolution advanced (LTE Advanced, LTE-A) or new radio (NR, 5G), without restricting the exemplary embodiments to such an architecture, however. It is obvious for a person skilled in the art that the exemplary embodiments may also be applied to other kinds of communications networks having suitable means by adjusting parameters and procedures appropriately. Some examples of other options for suitable systems may be the universal mobile telecommunications system (UMTS) radio access network (UTRAN or E-UTRAN), long term evolution (LTE, substantially the same as E-UTRA), wireless local area network (WLAN or Wi-Fi), worldwide interoperability for microwave access (WiMAX), Bluetooth®, personal communications services (PCS), ZigBee®, wideband code division multiple access (WCDMA), systems using ultra-wideband (UWB) technology, sensor networks, mobile ad-hoc networks (MANETs) and Internet Protocol multimedia subsystems (IMS) or any combination thereof.

Figure 1:
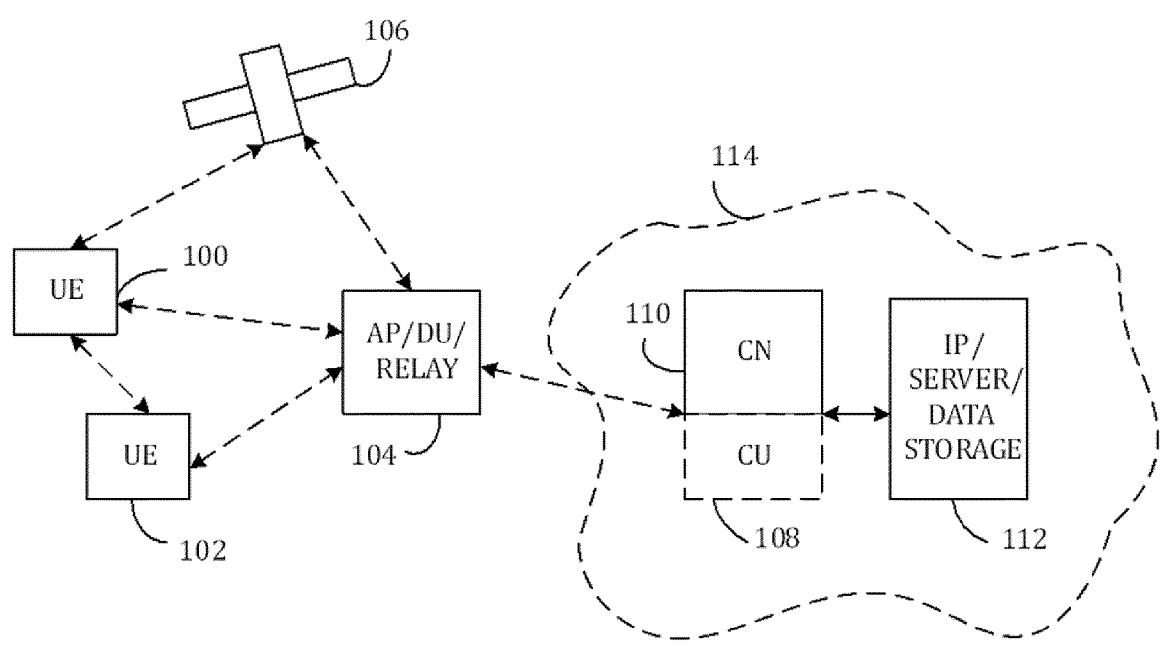
FIG. 1 illustrates an exemplary embodiment of a cellular communication network.

FIG. 1 depicts examples of simplified system architectures showing some elements and functional entities, all being logical units, whose implementation may differ from what is shown. The connections shown in FIG. 1 are logical connections; the actual physical connections may be different. It is apparent to a person skilled in the art that the system may also comprise other functions and structures than those shown in FIG. 1.

The exemplary embodiments are not, however, restricted to the system given as an example but a person skilled in the art may apply the solution to other communication systems provided with necessary properties.

The example of FIG. 1 shows a part of an exemplifying radio access network.

FIG. 1 shows user devices 100 and 102 configured to be in a wireless connection on one or more communication channels in a cell with an access node (such as (e/g)NodeB) 104 providing the cell. The physical link from a user device to a (e/g)NodeB may be called uplink or reverse link and the physical link from the (e/g)NodeB to the user device may be called downlink or forward link. It should be appreciated that (e/g)NodeBs or their functionalities may be implemented by using any node, host, server or access point etc. entity suitable for such a usage.

A communication system may comprise more than one (e/g)NodeB, in which case the (e/g)NodeBs may also be configured to communicate with one another over links, wired or wireless, designed for the purpose. These links may be used for signaling purposes. The (e/g) NodeB may be a computing device configured to control the radio resources of communication system it is coupled to. The (e/g) NodeB may also be referred to as a base station, an access point or any other type of interfacing device including a relay station capable of operating in a wireless environment. The (e/g) NodeB may include or be coupled to transceivers. From the transceivers of the (e/g)NodeB, a connection may be provided to an antenna unit that establishes bi-directional radio links to user devices. The antenna unit may comprise a plurality of antennas or antenna elements. The (e/g)NodeB may further be connected to core network 110 (CN or next generation core NGC). Depending on the system, the counterpart on the CN side may be a serving gateway (S-GW, routing and forwarding user data packets), packet data network gateway (P-GW), for providing connectivity of user devices (UEs) to external packet data networks, or mobile management entity (MME), etc.

The user device (also called UE, user equipment, user terminal, terminal device, etc.) illustrates one type of an apparatus to which resources on the air interface may be allocated and assigned, and thus any feature described herein with a user device may be implemented with a corresponding apparatus, such as a relay node. An example of such a relay node may be a layer 3 relay (self-backhauling relay) towards the base station. The self-backhauling relay node may also be called an integrated access and backhaul (IAB) node. The IAB node may comprise two logical parts: a mobile termination (MT) part, which takes care of the backhaul link(s) (i.e. link(s) between IAB node and a donor node, also known as a parent node) and a distributed unit (DU) part, which takes care of the access link(s), i.e. child link(s) between the IAB node and UE(s) and/or between the IAB node and other IAB nodes (multi-hop scenario).

The user device may refer to a portable computing device that includes wireless mobile communication devices operating with or without a subscriber identification module (SIM), including, but not limited to, the following types of devices: a mobile station (mobile phone), smartphone, personal digital assistant (PDA), handset, device using a wireless modem (alarm or measurement device, etc.), laptop and/or touch screen computer, tablet, game console, notebook, and multimedia device. It should be appreciated that a user device may also be a nearly exclusive uplink only device, of which an example may be a camera or video camera loading images or video clips to a network. A user device may also be a device having capability to operate in Internet of Things (IoT) network which is a scenario in which objects may be provided with the ability to transfer data over a network without requiring human-to-human or human-to-computer interaction. The user device may also utilize cloud. In some applications, a user device may comprise a small portable device with radio parts (such as a watch, earphones or eyeglasses) and the computation may be carried out in the cloud. The user device (or in some exemplary embodiments a layer 3 relay node) may be configured to perform one or more of user equipment functionalities. The user device may also be called a subscriber unit, mobile station, remote terminal, access terminal, user terminal, terminal device, or user equipment (UE) just to mention but a few names or apparatuses.

Various techniques described herein may also be applied to a cyber-physical system (CPS) (a system of collaborating computational elements controlling physical entities). CPS may enable the implementation and exploitation of massive amounts of interconnected ICT devices (sensors, actuators, processors microcontrollers, etc.) embedded in physical objects at different locations. Mobile cyber physical systems, in which the physical system in question may have inherent mobility, are a subcategory of cyber-physical systems. Examples of mobile physical systems include mobile robotics and electronics transported by humans or animals.

Additionally, although the apparatuses have been depicted as single entities, different units, processors and/or memory units (not all shown in FIG. 1) may be implemented.

5G may enable using multiple input-multiple output (MIMO) antennas, many more base stations or nodes than the LTE (a so-called small cell concept), including macro sites operating in co-operation with smaller stations and employing a variety of radio technologies depending on service needs, use cases and/or spectrum available. 5G mobile communications may support a wide range of use cases and related applications including video streaming, augmented reality, different ways of data sharing and various forms of machine type applications (such as (massive) machine-type communications (mMTC), including vehicular safety, different sensors and real-time control. 5G may be expected to have multiple radio interfaces, namely below 6 GHz, cmWave and mmWave, and also being integrable with existing legacy radio access technologies, such as the LTE. Integration with the LTE may be implemented, at least in the early phase, as a system, where macro coverage may be provided by the LTE, and 5G radio interface access may come from small cells by aggregation to the LTE. In other words, 5G may support both inter-RAT operability (such as LTE-5G) and inter-RI operability (inter-radio interface operability, such as below 6 GHz-cmWave, below 6 GHz-cmWave-mmWave). One of the concepts considered to be used in 5G networks may be network slicing in which multiple independent and dedicated virtual sub-networks (network instances) may be created within the substantially same infrastructure to run services that have different requirements on latency, reliability, throughput and mobility.

The current architecture in LTE networks may be fully distributed in the radio and fully centralized in the core network. The low latency applications and services in 5G may need to bring the content close to the radio which leads to local break out and multi-access edge computing (MEC). 5G may enable analytics and knowledge generation to occur at the source of the data. This approach may need leveraging resources that may not be continuously connected to a network such as laptops, smartphones, tablets and sensors. MEC may provide a distributed computing environment for application and service hosting. It may also have the ability to store and process content in close proximity to cellular subscribers for faster response time. Edge computing may cover a wide range of technologies such as wireless sensor networks, mobile data acquisition, mobile signature analysis, cooperative distributed peer-to-peer ad hoc networking and processing also classifiable as local cloud/fog computing and grid/mesh computing, dew computing, mobile edge computing, cloudlet, distributed data storage and retrieval, autonomic self-healing networks, remote cloud services, augmented and virtual reality, data caching, Internet of Things (massive connectivity and/or latency critical), critical communications (autonomous vehicles, traffic safety, real-time analytics, time-critical control, healthcare applications).

The communication system may also be able to communicate with other networks, such as a public switched telephone network or the Internet 112, or utilize services provided by them. The communication network may also be able to support the usage of cloud services, for example at least part of core network operations may be carried out as a cloud service (this is depicted in FIG. 1 by "cloud" 114). The communication system may also comprise a central control entity, or a like, providing facilities for networks of different operators to cooperate for example in spectrum sharing.

Edge cloud may be brought into radio access network (RAN) by utilizing network function virtualization (NFV) and software defined networking (SDN). Using edge cloud may mean access node operations to be carried out, at least partly, in a server, host or node operationally coupled to a remote radio head or a radio unit (RU), or a base station comprising radio parts. It may also be possible that node operations will be distributed among a plurality of servers, nodes or hosts. Carrying out the RAN real-time functions at the RAN side (in a distributed unit, DU 104) and non-real time functions in a centralized manner (in a central unit, CU 108) may be enabled for example by application of cloud-RAN architecture.

It should also be understood that the distribution of labour between core network operations and base station operations may differ from that of the LTE or even be non-existent. Some other technology advancements that may be used may be Big Data and all-IP, which may change the way networks are being constructed and managed. 5G (or new radio, NR) networks may be designed to support multiple hierarchies, where MEC servers may be placed between the core and the base station or nodeB (gNB). It should be appreciated that MEC may be applied in 4G networks as well.

5G may also utilize satellite communication to enhance or complement the coverage of 5G service, for example by providing backhauling. Possible use cases may be providing service continuity for machine-to-machine (M2M) or Internet of Things (IoT) devices or for passengers on board of vehicles, or ensuring service availability for critical communications, and future railway/maritime/aeronautical communications. Satellite communication may utilize geostationary earth orbit (GEO) satellite systems, but also low earth orbit (LEO) satellite systems, in particular mega-constellations (systems in which hundreds of (nano)satellites are deployed). At least one satellite 106 in the mega-constellation may cover several satellite-enabled network entities that create on-ground cells. The on-ground cells may be created through an on-ground relay node 104 or by a gNB located on-ground or in a satellite.

It is obvious for a person skilled in the art that the depicted system is only an example of a part of a radio access system and in practice, the system may comprise a plurality of (e/g)NodeBs, the user device may have an access to a plurality of radio cells and the system may also comprise other apparatuses, such as physical layer relay nodes or other network elements, etc. At least one of the (e/g) NodeBs or may be a Home(e/g)nodeB.

Furthermore, the (e/g)nodeB or base station may also be split into: a radio unit (RU) comprising a radio transceiver (TRX), i.e. a transmitter (TX) and a receiver (RX); one or more distributed units (DUs) that may be used for the so-called Layer 1 (L1) processing and real-time Layer 2 (L2) processing; and a central unit (CU) or a centralized unit that may be used for non-real-time L2 and Layer 3 (L3) processing. The CU may be connected to the one or more DUs for example by using an F1 interface. Such a split may enable the centralization of CUs relative to the cell sites and DUs, whereas DUs may be more distributed and may even remain at cell sites. The CU and DU together may also be referred to as baseband or a baseband unit (BBU). The CU and DU may also be comprised in a radio access point (RAP).

The CU may be defined as a logical node hosting higher layer protocols, such as radio resource control (RRC), service data adaptation protocol (SDAP) and/or packet data convergence protocol (PDCP), of the (e/g)nodeB or base station. The DU may be defined as a logical node hosting radio link control (RLC), medium access control (MAC) and/or physical (PHY) layers of the (e/g)nodeB or base station. The operation of the DU may be at least partly controlled by the CU. The CU may comprise a control plane (CU-CP), which may be defined as a logical node hosting the RRC and the control plane part of the PDCP protocol of the CU for the (e/g)nodeB or base station. The CU may further comprise a user plane (CU-UP), which may be defined as a logical node hosting the user plane part of the PDCP protocol and the SDAP protocol of the CU for the (e/g)nodeB or base station.

Cloud computing platforms may also be used to run the CU and/or DU. The CU may run in a cloud computing platform, which may be referred to as a virtualized CU (vCU). In addition to the vCU, there may also be a virtualized DU (vDU) running in a cloud computing platform. Furthermore, there may also be a combination, where the DU may use so-called bare metal solutions, for example application-specific integrated circuit (ASIC) or customer-specific standard product (CSSP) system-on-a-chip (SoC) solutions. It should also be understood that the distribution of labour between the above-mentioned base station units, or different core network operations and base station operations, may differ.

Additionally, in a geographical area of a radio communication system, a plurality of different kinds of radio cells as well as a plurality of radio cells may be provided. Radio cells may be macro cells (or umbrella cells) which may be large cells having a diameter of up to tens of kilometers, or smaller cells such as micro-, femto- or picocells. The (e/g) NodeBs of FIG. 1 may provide any kind of these cells. A cellular radio system may be implemented as a multilayer network including several kinds of cells. In multilayer networks, one access node may provide one kind of a cell or cells, and thus a plurality of (e/g) NodeBs may be needed to provide such a network structure.

For fulfilling the need for improving the deployment and performance of communication systems, the concept of "plug-and-play" (e/g) NodeBs may be introduced. A network which may be able to use "plug-and-play" (e/g) NodeBs, may include, in addition to Home (e/g) NodeBs (H(e/g)nodeBs), a home node B gateway, or HNB-GW (not shown in FIG. 1). A HNB Gateway (HNB-GW), which may be installed within an operator's network, may aggregate traffic from a large number of HNBs back to a core network.

In wireless communication systems, information may be transmitted via a radio channel. The effect of the channel on the transmitted signal may need to be estimated in order to recover the transmitted data. For example, with binary phase shift keying (BPSK), binary information is represented as +1 and −1 symbol values. The radio channel may apply a phase shift to the transmitted symbols, possibly inverting the symbol values. As long as the receiver can estimate what the channel did to the transmitted signal, it can accurately recover the data comprised in the signal.

Reference signals (RS), which may also be referred to as pilots, may be transmitted along with the data in order to obtain channel state information knowledge for proper decoding of received signals. Reference signals are pre-defined signals that are known at both the transmitter and receiver. Thus, the receiver can estimate the effect of the channel by comparing the received reference signal with the original reference signal known at the receiver. Reference signals may be used in both downlink (DL) and uplink (UL) for example for obtaining accurate channel knowledge in order to derive channel state information (CSI), for demodulating data, for allowing the receiver to perform fine time and frequency channel tracking, for UL/DL beam management, for UL/DL scheduling purposes, and/or for interference estimation in UL/DL.

For example, the following reference signals may be used in NR: demodulation reference signal (DM-RS), phase-tracking reference signal (PT-RS), non-zero power (NZP) channel state information reference signal (CSI-RS), synchronization signal block (SSB), and sounding reference signal (SRS).

DM-RS may be used by a receiver to estimate the radio channel for demodulation of the associated physical channel. DM-RS design and resource mapping may be specific to a given DL or UL NR channel, such as a physical broadcast channel (PBCH), physical downlink control channel (PDCCH), physical downlink shared channel (PDSCH), physical uplink control channel (PUCCH), or physical uplink shared channel (PUSCH). DM-RS may be specific for a given UE, and transmitted on demand. The system can precode and/or beamform the DM-RS, keep it within a scheduled resource, and transmit it when necessary in either downlink or uplink. Additionally, multiple orthogonal DM-RSs can be allocated to support MIMO transmission. The network may present UEs with DM-RS information early on for the initial decoding requirement that low-latency applications may need, but it may only occasionally present this information for low-speed scenarios, in which the channel shows little change. In high-mobility scenarios to track fast changes in the channel, it may increase the rate of transmission of the DM-RS signal (called "additional DM-RS").

PT-RS may be used to track the phase of the local oscillator at the transmitter and/or receiver. The phase noise of a transmitter increases as the frequency of operation increases. One of the main problems that phase noise introduces into an orthogonal frequency-division multiplexing (OFDM) signal appears as a common phase rotation of the sub-carriers, known as the common phase error (CPE). PT-RS enables suppression of phase noise and CPE for example at higher mmWave frequencies. PT-RS may be present both in the uplink and downlink data channels (i.e. PUSCH and PDSCH). The presence as well as the time and frequency domain density of the PT-RS is a function of the modulation and coding scheme (MCS), and the allocation bandwidth of the PUSCH and PDSCH. Due to phase noise properties, PT-RS has a low density in the frequency domain and a high density in the time domain. The density in the frequency domain is a function of the allocation bandwidth, and the density in the time domain is a function of the MCS. PT-RS may be associated with one DM-RS port during transmission. Moreover, PT-RS may be confined to the scheduled bandwidth and the duration used for PDSCH and PUSCH. The system may map the PT-RS information to a few subcarriers per symbol, because the phase rotation affects the sub-carriers with an OFDM symbol equally, but shows low correlation from symbol to symbol.

CSI-RS is a downlink signal. The CSI-RS that a UE receives is used to estimate the channel and report channel quality information back to the base station. For example, the CSI-RS may be used for reference signal received power (RSRP) measurements during mobility and beam management. CSI-RS may also be used for frequency and/or time tracking, demodulation, and UL channel reciprocity-based precoding. CSI-RS may be configured specific to a given UE, but multiple UEs may also share the same resource. 5G NR allows a high level of flexibility in CSI-RS configurations, and a resource can be configured with up to 32 ports, for example. A CSI-RS resource may start at any OFDM symbol of the slot and it may occupy, for example, 1, 2 or 4 OFDM symbols depending on the configured number of ports. CSI-RS may be periodic, semi-persistent, or aperiodic due to downlink control information (DCI) triggering. For time and/or frequency tracking, CSI-RS can be periodic or aperiodic. It may be transmitted in bursts of two or four symbols, which may be spread across one or two slots. The time and/or frequency tracking CSI-RS may also be called a tracking reference signal (TRS). During MIMO operations, NR may use different antenna approaches based on the carrier frequency. At lower frequencies, the system may use a modest number of active antennas for multi-user MIMO (MU-MIMO) and adds frequency-division duplexing (FDD) operations. In this case, the UE may use the CSI-RS to calculate the CSI and report it back in the uplink direction.

SSB may be used for beam management. To enable a UE to find a cell while entering a system, as well as to find new cells when moving within the system, a synchronization signal comprising a primary synchronization signal (PSS) and a secondary synchronization signal (SSS) may be periodically transmitted on the downlink from a given NR cell. Thus, the PSS and SSS along with PBCH can be jointly referred to as the SSB. The synchronization is a process, in which the UE obtains the time and frequency information of the wireless network in order for the UE to access the network.

SRS is an uplink reference signal that may be transmitted by a UE to assist a base station to obtain the CSI for the UE. CSI describes how the transmitted signal from the UE to the base station is impacted by a channel, and it represents the combined effect of scattering, fading, power decay, time delay and Doppler spread and/or Doppler shift. Furthermore, the channel may also cover implementation-specific impacts at a transmitter and/or receiver, such as a frequency offset due to oscillator drifting at the transmitter and/or receiver. The system may use the SRS for resource scheduling, link adaptation, massive MIMO, and/or beam management. The SRS may be configured specific to a given UE. In NR Rel-15, in the time domain, SRS may span 1, 2 or 4 consecutive symbols, which may be mapped within the last six symbols of the slot. In NR Rel-17, the time-span of UL SRS can be up to 14 symbols (covering also options e.g. up to 8, 10 and 12 symbols). Multiple SRS symbols allow coverage extension and increased sounding capacity.

NR Rel-15 can operate with a beam-based mode, both below and above the 6 GHz carrier frequency range, where both transmitter and receiver use spatial domain beamforming (e.g. in analog or digital domain) at TX and/or RX to cover a propagation loss associated with a radio channel. UEs may be equipped with multiple RX antenna panels associated with multiple antenna elements. Depending on the UE reception capability, a set of UE antenna panels may be simultaneously used for reception. In NR Rel-17, both downlink and uplink transmission schemes for reference signals may be enhanced to enable more flexible and efficient support for multiple transmission reception point (multi-TRP) operation.

NR Rel-15 provides support for single-user DL PDSCH scheduling for up to 8 layers (i.e. rank 8). However, Rel-15 UL SRS resource configuration with antenna switching can provide support for UEs equipped with up to 4 RX antenna ports. In other words, even though a UE may be equipped for example with 8 RX antenna ports, in NR Rel-15 just 4 out of the 8 antenna ports can be used for DL CSI acquisition at gNB-based UL SRS sounding. This may lead to suboptimal use of DL TX precoding as well as RX processing, thus limiting system performance for example in terms of spectral efficiency and interference mitigation.

Although a UE may comprise e.g. 4 or 8 RX antennas, the number of its uplink TX antennas may be smaller, since UL transmission may be more power-limited than DL transmission, and it may be more efficient not to increase the number of layers per UE in power-limited conditions. Furthermore, adding TX radio frequency (RF) chains to the UE may cause several implementation issues, such as excessive UE power drainage, and placement overlaps e.g. with cameras and sensors in smart phones. A single TX RF chain may be connected to one of the RX antennas through a switch when it transmits SRS. This switch may be used to switch the TX RF chain between the different RX antennas in order to alternate the transmission of SRS from different antennas. This switching may be referred to as antenna switching. A UE may transmit an individual SRS for each receive antenna, and the base station is then able to construct a channel matrix from the received SRS responses. The base station can decide the best precoder and/or beamforming weights to maximize DL capacity without quantization error, as long as the received quality of SRS is high enough.

Figure 3:
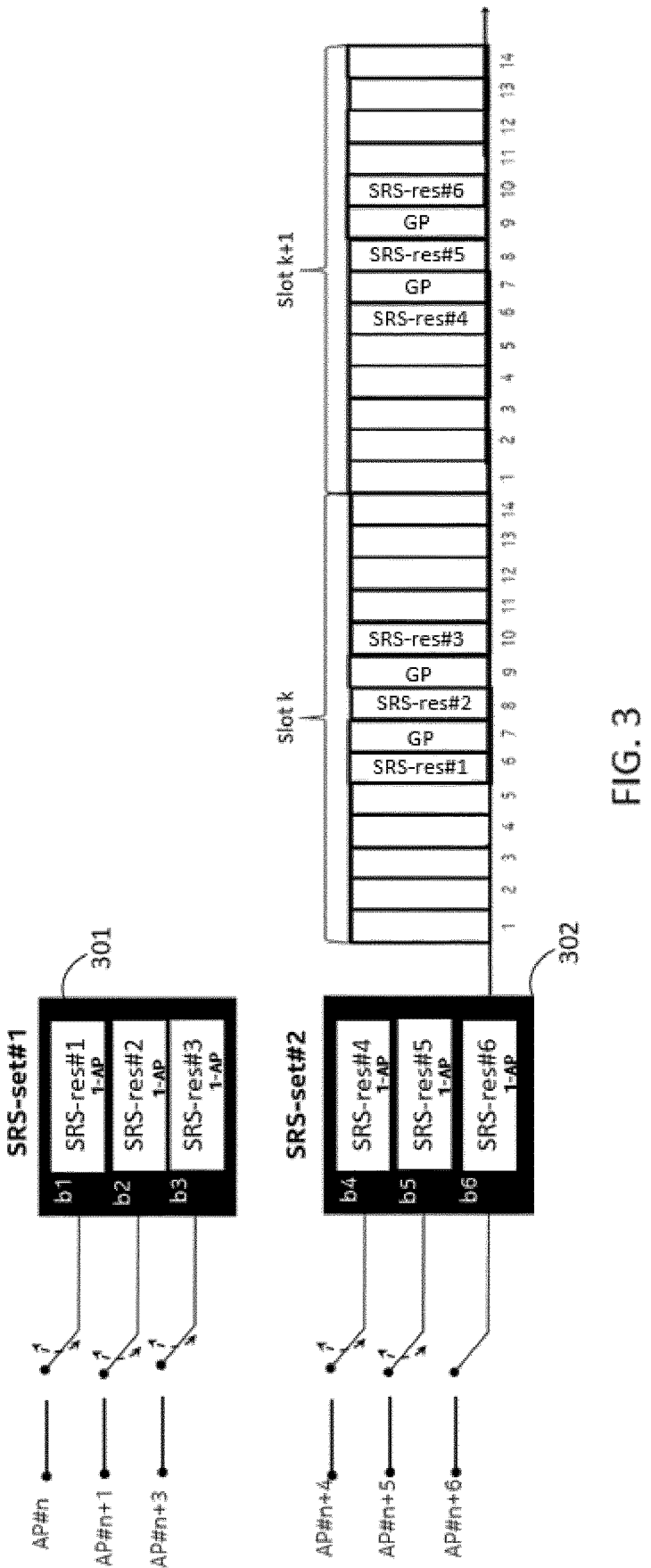
FIG. 3 illustrates an example of uplink sounding reference signal resource configuration.

In NR Rel-15, depending on the reported UE antenna-switching capability, the UE can be configured with one of the following antenna-switching configurations, where T refers to transmission antenna port and R refers to reception antenna port at the UE side (herein antenna port refers to a logical antenna port):

'tlr2' for 1T2R (i.e. one transmission antenna port and two reception antenna ports), 'tlr1-tlr2' for 1T=1R/1T2R (i.e. one transmission antenna port and one or two reception antenna ports), 't2r4' for 2T4R (i.e. two transmission antenna ports and four reception antenna ports), 'tlr4' for 1T4R (i.e. one transmission antenna port and four reception antenna ports), 'tlr1-tlr2-tlr4' for 1T=1R/1T2R/1T4R (i.e. one transmission antenna port and one, two or four reception antenna ports), 'tlr4-t2r4' for 1T4R/2T4R (i.e. one or two transmission antenna ports and four reception antenna ports), 'tlr1-tlr2-t2r2-t2r4' for 1T=1R/1T2R/2T=2R/2T4R (i.e. one transmission antenna port and one reception antenna port, or one transmission antenna port and two reception antenna ports, or two transmission antenna ports and two reception antenna ports, or two transmission antenna ports and four reception antenna ports), 'tlr1-tlr2-t2r2-tlr4-t2r4' for 1T=1R/1T2R/2T=2R/1T4R/2T4R (i.e. one transmission antenna port and one reception antenna port, or one transmission antenna port and two reception antenna ports, or two transmission antenna ports and two reception antenna ports, or one transmission antenna ports and four reception antenna ports, or two transmission antenna ports and four reception antenna ports), 'tlrl' for 1T=1R (i.e. one transmission antenna port and one reception antenna port), 't2r2' for 2T=2R (i.e. two transmission antenna ports and two reception antenna ports), 'tlrl-t2r2' for 1T=1R/2T=2R (i.e. one transmission antenna port and one reception antenna port, or two transmission antenna ports and two reception antenna ports), 't4r4' for 4T=4R (i.e. four transmission antenna ports and four reception antenna ports), or 'tlrl-t2r2-t4r4' for 1T=1R/2T=2R/4T=4R (i.e. one transmission antenna port and one reception antenna port, or two transmission antenna ports and two reception time. As shown in FIG. 3, two different resource sets 301, 302 (SRS-set #1 and SRS-set #2) can be configured. In a given set, three different 1-AP resources (SRS-res #1, SRS-res #2 and SRS-res #3 in SRS-set #1, and SRS-res #4, SRS-res #5 and SRS-res #6 in SRS-set #2) associated with different symbol time instants may be configured. 1-AP is an abbreviation for one antenna port. By following NR Rel-15, minimum guard periods (GPs) according to SCS need to be configured between resources within the SRS set. An alternative resource configuration could be to configure all 1-AP resources into a single resource set.

Regarding UL SRS power control, if a UE transmits SRS on active UL BWP b of carrier f of serving cell c using SRS power control adjustment state with index l, the UE may determine the SRS transmission power $P_{SRS,b,f,c}(i,q_s,l)$ in SRS transmission occasion i for example as:

$$P_{SRS,b,f,c}(i, q_s, l) = \min\left\{ \begin{array}{l} P_{CMAX,f,c}(i), \\ P_{O\_SRS,b,f,c}(q_s) + 10\log_{10}(2^\mu \cdot M_{SRS,b,f,c}(i)) + \alpha_{SRS,b,f,c}(q_s) \cdot PL_{b,f,c}(q_d) + h_{b,f,c}(i, l) \end{array} \right\} [dBm]$$

antenna ports, or four transmission antenna ports and four reception antenna ports).

NR Rel-15 provides support for resource-specific repetition, where one UL SRS resource can be repeated in up to 4 symbols (including also repetition of 2 symbols). The SRS resource can be configured into 1 or 2 or 4 of the last 6 symbols in a slot. Furthermore, NR Rel-15 supports UL SRS resource configuration with intra-slot frequency domain hopping with repetition, where the same set of subcarriers is to be sounded in consecutive 2 or 4 OFDM symbols within a slot before the next frequency hop occurs.

NR Rel-15 supports the following SRS time domain behaviors: periodic, semi-persistent, and aperiodic transmissions. With semi-persistent SRS transmission, MAC control elements (CEs) are used to activate and deactivate a semi-persistent set of one or more SRS resources. While activated, an SRS resource is transmitted with a configured periodicity and slot offset. MAC CE activation/deactivation enables more dynamic on/off control compared to periodic SRS resources, which are configured by RRC.

NR Rel-17 may specify enhanced mechanisms for UL SRS to enable more flexible triggering on aperiodic SRS sets, for example by specifying SRS switching for up to 8 antenna ports. In NR Rel-17, for example the following additional antenna-switching configurations may be supported: 1T6R, 1T8R, 2T6R, 2T8R and 4T8R.

To enhance the coverage of UL SRS, NR Rel-17 may provide support for resource-specific repetition, where one resource can be repeated for up to 12 symbols (including also 2, 4, or 6 symbols). In the future, it may also be possible to increase the resource-specific repetition to up to 14 symbols and beyond.

Figure 2:
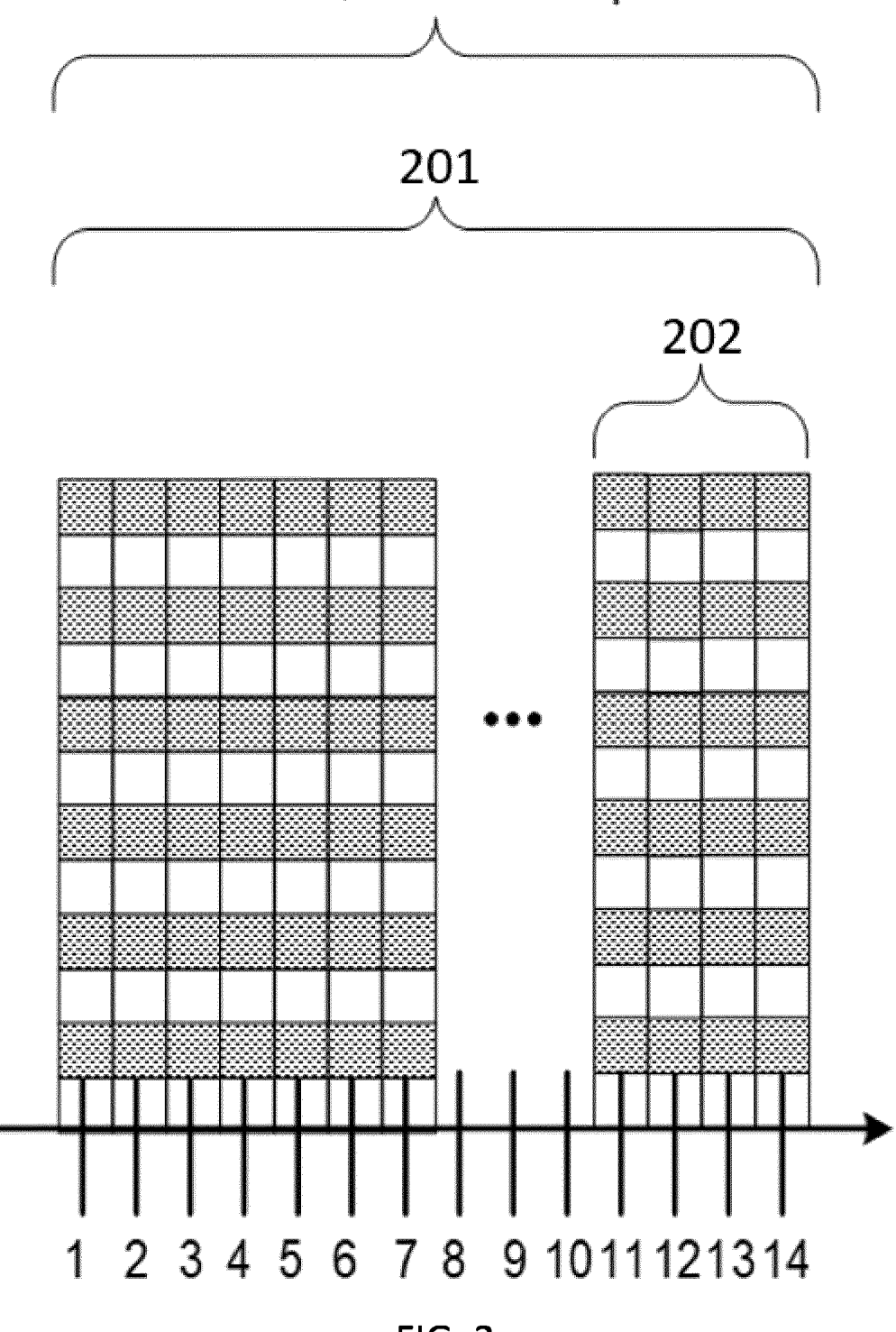
FIG. 2 illustrates an example of potentially achievable received power gains with intra-slot repetition.

FIG. 2 illustrates an example of potentially achievable received power gains with intra-slot repetition, where power gains can be obtained by increasing the number of repeated symbols to up to 14. For example, when 14 symbols in a slot are repeated 201, a 5.4 dB increase in received power may be achieved in comparison to the NR Rel-15 legacy solution, where only up to 4 symbols can be repeated 202.

To enable enhanced system performance, as discussed above, NR Rel-17 may provide support for UL SRS antenna-switching configurations with 6 and 8 UE RX antenna ports. FIG. 3 illustrates an example of UL SRS resource configuration for 1T6R with 15 kHz subcarrier spacing (SCS) and a corresponding resource allocation in $P_{CMAX,f,c}(i)$ is the configured UE transmit power for carrier f of serving cell c in SRS transmission occasion i.

$P_{O\_SRS,b,f,c}(q_s)$ is provided by the parameter p0 for active UL BWP b of carrier f of serving cell c and SRS resource set $q_s$ provided by SRS-ResourceSet and SRS-ResourceSetId. If p0 is not provided, then $P_{O\_SRS,b,f,c}(q_s) = P_{O\_NOMINAL\_PUSCH,f,c}(0)$. p0 defines the received power expected at the base station.

$M_{SRS,b,f,c}(i)$ is a SRS bandwidth expressed in number of resource blocks for SRS transmission occasion i on active UL BWP b of carrier f of serving cell c, and $\mu$ is a SCS configuration.

$\alpha_{SRS,b,f,c}$ is provided by the parameter alpha for active UL BWP b of carrier f of serving cell c and SRS resource set $q_s$. The parameter alpha defines the path loss compensation factor.

$PL_{b,f,c}(q_d)$ is a downlink pathloss estimate in dB calculated by the UE using RS resource index $q_d$ for the active DL BWP of serving cell c and SRS resource set $q_s$. The RS resource index $q_d$ is provided by pathlossReferenceRS associated with the SRS resource set $q_s$, and it may be a ssb-Index providing a SS/PBCH block index, or a csi-RS-Index providing a CSI-RS resource index. If the UE is not provided pathlossReferenceRS, or before the UE is provided dedicated higher layer parameters, the UE may calculate $PL_{b,f,c}(q_d)$ using a RS resource obtained from the SS/PBCH block that the UE uses to obtain the master information block (MIB). If the UE is provided pathlossReferenceLinking, the RS resource is on a serving cell indicated by a value of pathlossReferenceLinking.

For the SRS power control adjustment state for active UL BWP b of carrier f of serving cell c and SRS transmission occasion i, $$h_{b,f,c}(i, l) = f_{b,f,c}(i, l) \text{ where } f_{b,f,c}(i, l)$$

is the current PUSCH power control adjustment state, if srs-PowerControlAdjustmentStates indicates a same power control adjustment state for SRS transmissions and PUSCH transmissions. Alternatively, $$h_{b,f,c}(i, l) = h_{b,f,c}(i-1) + \sum_{m=0}^{C(S_l)-1} \delta_{SRS,b,f,c}(m),$$

if the UE is not configured for PUSCH transmissions on active UL BWP b of carrier f of serving cell c, or if srs-PowerControlAdjustmentStates indicates separate power control adjustment states between SRS transmissions and PUSCH transmissions, and if tpc-Accumulation is not provided.

UL power control parameters may be defined at the UL SRS resource set level. In other words, all UL SRS resources within the same UL SRS resource set may share the same power control parameterization (e.g. $P_{O\_SRS,b,f,c}(q_s)$, $\alpha_{SRS,b,f,c}(q_s)$, $PL_{b,f,c}(q_d)$).

The current UL SRS antenna-switching resource configurations do not take into account any UE RF impairments, i.e. power imbalance between UL SRS antenna ports and associated losses and/or gains with different TX RF chains. As a result of this, DL CSI acquisition based on UL SRS sounding with antenna port imbalance may lead to a degraded demodulation performance of PDSCH due to inaccurate DL CSI used in the DL TX precoder determination at the gNB side.

Figure 4:
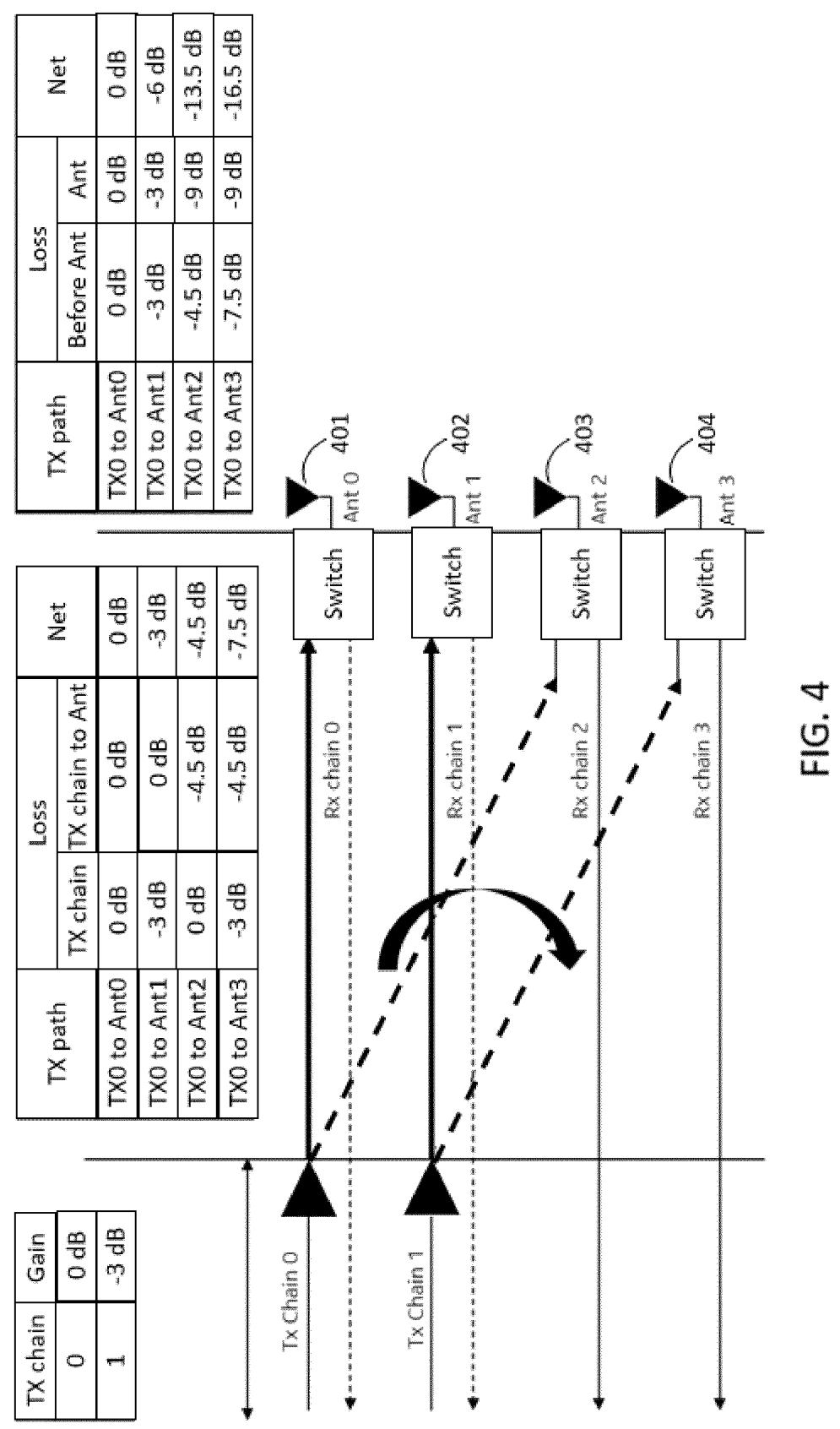
FIG. 4 illustrates an example of a UE having a 2T4R antenna-switching capability and corresponding possible implementation losses.

FIG. 4 illustrates an example of a UE having 2T4R capability with TX RF chains and corresponding possible implementation losses to provide an example of root causes for the power imbalance of UL SRS antenna ports at the UE side. As shown in FIG. 4, TX path can cover different implementation losses, including losses related to TX chain, and TX chain to antenna. For example, the TX path 'TX0 to Ant2' can include the following implementation losses: a 0 dB TX chain loss and a –4.5 dB TX-chain-to-antenna loss, resulting in a –4.5 dB total loss. An RF chain refers to a set of electronic components, such as amplifiers, filters, mixers, attenuators and/or detectors, connected to one or more respective antennas. RF chain may sometimes also be referred to as an antenna chain. In FIG. 4, a first antenna 401 (denoted as Ant0) is used for transmission or reception, a second antenna 402 (denoted as Ant1) is used for transmission or reception, a third antenna 403 (denoted as Ant2) is used for reception except for SRS transmission, and a fourth antenna 404 (denoted as Ant3) is used for reception except for SRS transmission.

When a UE supports UL MIMO and/or a TX diversity feature for a time-division duplexing (TDD) band, the UE may support 2 TX/RX RF chains and 2 RX RF chains, i.e. 2T4R in total. In this case, the UE may need to implement at least two power amplifiers associated with power class (PC), where the configurations can be PC3+PC3, PC2+PC3, PC2+PC2, etc. PC3 means a nominal maximum output power of 23 dBm, and PC2 means a nominal maximum output power of 26 dBm. It should be noted that the output power is defined at the output from the antenna connector without including antenna gain. Hence, the achievable TX power from the respective power amplifiers may different for PC2+PC3 configuration, and a 3 dB difference can be seen as shown in FIG. 4, where Tx Chain 0 uses PC2 and Tx Chain 1 uses PC3.

Figure 5:
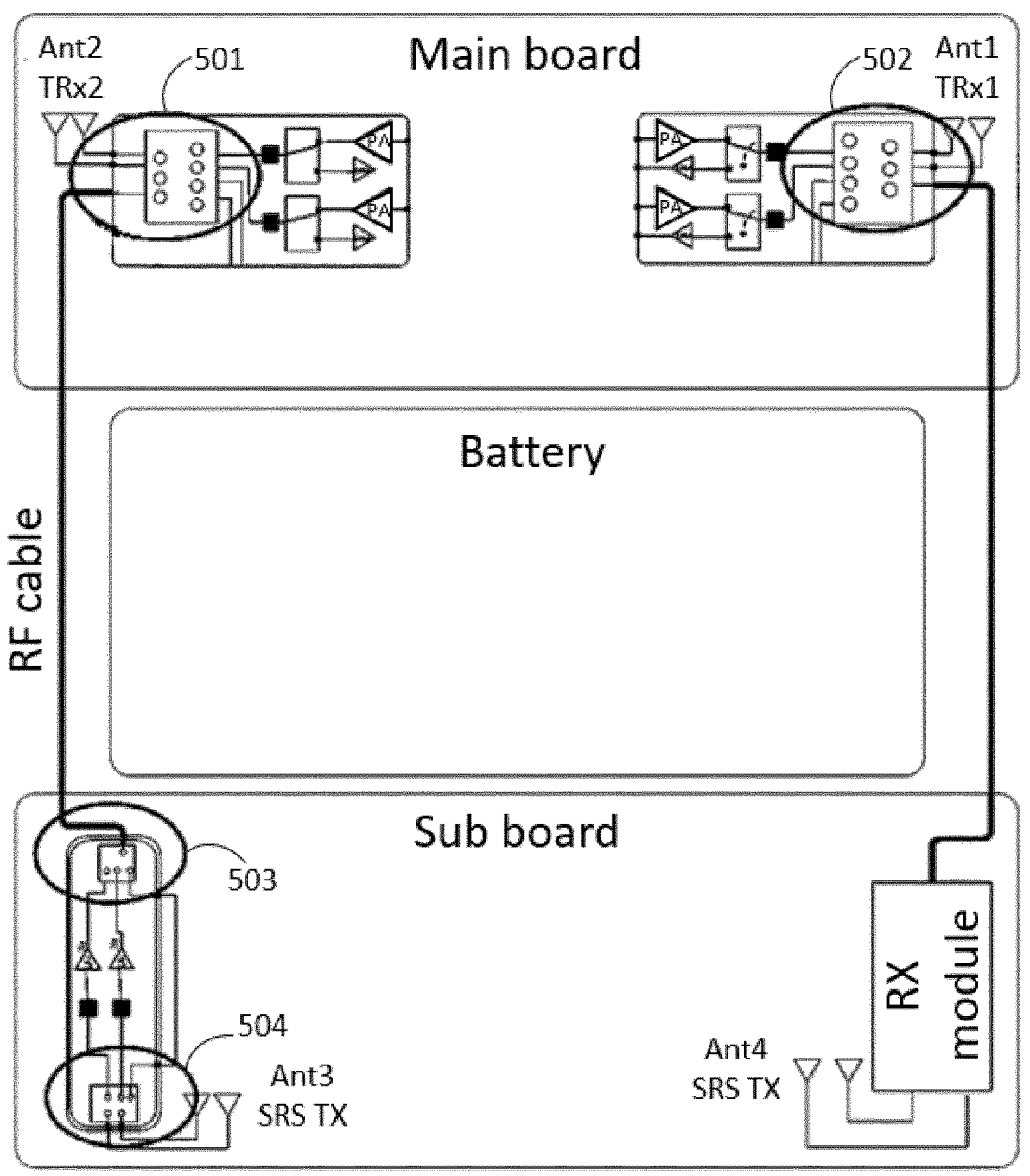
FIG. 5 illustrates an example architecture of a UE having a 2T4R antenna-switching capability.

Furthermore, in practice, there may be various implementation-specific factors that impact the power of UL SRS transmission after the respective power amplifiers. FIG. 5 illustrates an implementation example of a UE having 2T4R antenna-switching capability. As can be seen from FIG. 5, UL SRS transmission after the power amplifiers (PAS) may be degraded by implementation factors, such as RF switch loss, RF cable loss, printed circuit board (PCB) trace loss, etc., before the SRS transmission reaches the corresponding antenna connectors. In this example, the UE comprises two switch matrices 501, 502, a single pole triple throw (SP3T) switch 503, and a double pole triple throw (DP3T) switch 504.

A UE may use a relaxation defined as $\Delta T_{RxSRS}$, which may be applied when (1) the UE transmits SRS to other than first SRS antenna port when the SRS-TxSwitch capability is indicated as '1T2R', '1T4R' or, '1T4R/2T4R', (2) the UE transmits SRS to other than the first or second SRS antenna port when the SRS-TxSwitch capability is indicated as '2T4R' or '1T4R/2T4R', or (3) the UE transmits SRS to a DL-only carrier. For example, the value of $\Delta T_{RxSRS}$ may be 4.5 dB for n79, and 3 dB for bands whose $F_{UL\_high}$ is lower than the $F_{UL\_low}$ of n79, when the UE is capable of PC3 in the band. The value of $\Delta T_{RxSRS}$ may be 7.5 dB for n79, and 6 dB for bands whose $F_{UL\_high}$ is lower than the $F_{UL\_low}$ of n79, when the UE is capable of power class 2 in the band. For other SRS transmissions, $\Delta T_{RxSRS}$ may be zero.

In other words, a UE with 2T4R for n79, which is a TDD band whose frequency is 4400-5000 MHz for PC3, is allowed to reduce its maximum output power by 4.5 dB, when the 2 RX RF chains are connected to the TX RF chains.

Furthermore, a UE may have various constraints such as the form factor, the size of the UE, etc. Because of these constraints, it may be assumed that the UE has an antenna gain imbalance across the antennas. As an example, given that the first antenna (primary antenna) is the reference, the second, third and fourth antenna may have a degradation of 3, 9 and 9 dB, respectively, compared to the primary antenna.

However, the current UL SRS antenna switching configurations may not be able to take into account any of the UE RF impairments described above. An issue with the current configurations is that the repetition can only be configured resource-specifically (i.e. a resource consists of a set of multiple antenna ports associated with resource elements). In other words, according to the current configurations, the number of repetitions of UL SRS resource transmissions is the same across multiple antennas. Therefore, there is a need to provide new SRS configurations for antenna switching that are able take into account the UE RF impairments in a more efficient manner.

Some exemplary embodiments provide antenna-port-specific resource configurations and transmission procedures for an uplink reference signal, such as UL SRS, UL DM-RS, or UL PT-RS. Some exemplary embodiments provide antenna-port-specific repetition and/or antenna-port-specific UL power control that enable to mitigate UE TX RF chain-specific losses/attenuations.

Figure 6:
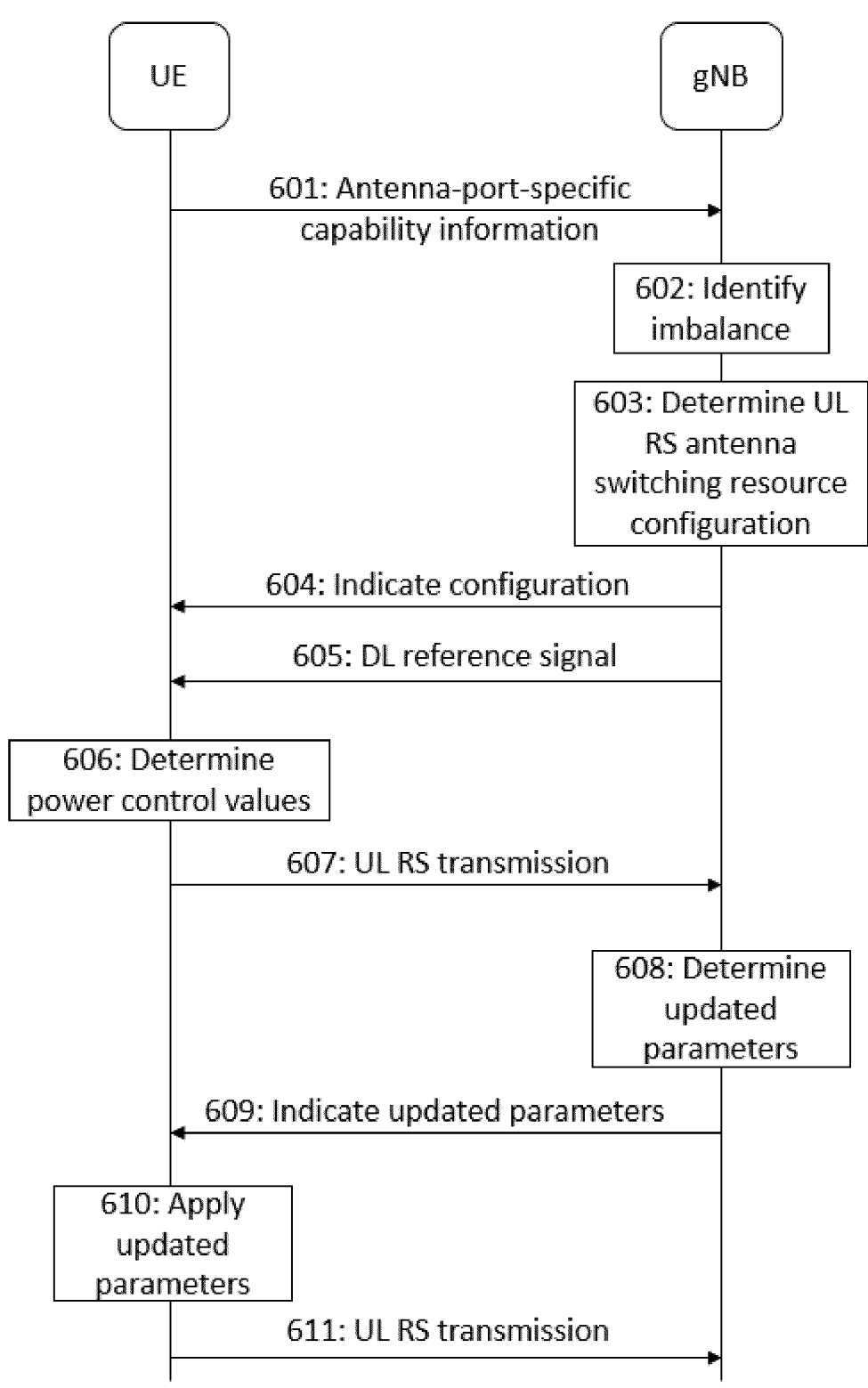
FIGS. 6-7 illustrate signaling diagrams according to some exemplary embodiments.

FIG. 6 illustrates a signaling diagram according to an exemplary embodiment. Referring to FIG. 6, a UE transmits 601, to a base station such as a gNB, antenna-port-specific capability information associated with UL RS antenna switching for a plurality of antenna ports associated with the UE. In other words, the plurality of antenna ports may be UL RS antenna ports associated with antenna switching. The capability information may also be referred to as a capability report. The capability information may be transmitted via RRC signaling. Before the UE is in RRC connected state, the base station needs to understand the UE's capabilities, so that it can configure the UE accordingly. Furthermore, the base station can request the UE to send its capabilities at any time during the RRC connected state. The antenna-port-specific capability information comprises UL RS antenna-port-specific RF capabilities related to UL RS antenna-switching configurations. For example, the antenna-port-specific capability information may comprise at least one of:

a gain or attenuation associated with a transmit RF chain (i.e. TX-chain-specific gain/attenuation), a gain or attenuation between the transmit RF chain and an antenna (i.e. TX-chain-to-antenna gain/attenuation), a gain associated with the antenna (i.e. antenna gain), and/or a total transmitter gain or attenuation, wherein the total transmitter gain or attenuation may comprise all of the previous attenuations or gains.

The base station identifies 602 a power imbalance between the plurality of UL RS antenna ports associated with the UE, wherein the power imbalance is identified based at least partly on the antenna-port-specific capability information received from the UE. The power imbalance may be associated with attenuations and/or gains of different TX RF chains associated with UL RS resources of an UL RS antenna-switching configuration.

In order to obtain power balance between the plurality of UL RS antenna ports associated with the UE, the base station determines 603, based at least partly on the identified imbalance and/or the antenna-port-specific capability information received from the UE, an UL RS antenna switching resource configuration comprising one or more antenna-port-specific repetition patterns and/or one or more antenna-port-specific uplink power control target values (i.e. p0) for the plurality of antenna ports associated with the UE. The one or more antenna-port-specific uplink power control target values may indicate the received power level expected at the base station. The UL RS antenna switching resource configuration may also comprise one or more path loss compensation factors (i.e. alpha) for uplink power control of the UE.

An antenna-port-specific repetition pattern may be used to configure the UE to repeat a transmission of resource elements associated with a specific antenna port over consecutive and/or non-consecutive OFDM symbols in a slot. As a non-limiting example, the antenna port may be repeated e.g. in a first OFDM symbol and a second OFDM symbol (i.e. consecutive symbols) and then again e.g. in a fourth OFDM symbol (i.e. a non-consecutive symbol due to skipping the third OFDM symbol). The base station may determine different repetition patterns for different antenna ports (e.g. a first repetition pattern for a first antenna port, a second repetition pattern for a second antenna port, and so forth).

The base station may determine different power control target values for different antenna ports (e.g. a first power control target value for a first antenna port, a second power control target value for a second antenna port, and so forth).

For example, when a UE TX antenna chain is mapped to a first antenna port having a gain of 6 dB, and to a second antenna port having a gain of 9 dB, the base station may configure a 3 dB lower target power value (p0) for the second antenna port than for the first antenna port.

In an alternative example, when a UE TX antenna chain is mapped to a first antenna port having a gain of 0 dB, and to a second antenna port having a gain of −3 dB, the base station may configure a 3 dB higher target power value (p0) for the second antenna port than for the first antenna port.

The base station indicates 604, to the UE, the UL RS antenna switching resource configuration comprising the one or more antenna-port-specific repetition patterns and/or the one or more antenna-port-specific uplink power control target values for transmitting UL RS. The configuration may be indicated, for example, via RRC signaling.

As a non-limiting example for indicating the one or more antenna-port-specific repetition patterns, a higher layer configured UL-SRS-AP-specif-rep mapping may comprise the following information elements: a vector (called e.g. antenna-port-repetition-pattern) with a length (or size) of e.g. 14 bits, where a binary value '0' of a bit defines no repetition with a specific antenna port at a particular OFDM symbol, and a binary value '1' of a bit defines the specific antenna port to be repeated at a particular OFDM symbol. For example, an antenna-port-specific repetition pattern [0,1,0,1,1,0,0,0,0,0,0,0,0,0] defines that this specific antenna port is repeated three times at the 2nd, 4th and 5th OFDM symbol in the slot (assuming 15 kHz numerology in this example). In other words, in this example, the repetition pattern indicates the number of repeated symbols as well as the time locations of the repetitions. It should be noted that the length of the vector may also be different than 14 and it can be configured by the base station.

Alternatively, an antenna-port-specific repetition pattern may just comprise a repetition factor defining the number of repeated symbols (i.e. without specifying the time locations of the repetitions). In this case, the UE may be configured with a separate higher-layer-configured parameter that defines, per antenna port, locations in time domain and/or frequency.

The base station may transmit 605 a downlink reference signal (DL-RS), for example SSB or non-zero-power channel state information reference signal (NZP-CSI-RS), to the UE in order to enable the UE to take into account the UE TX antenna-port-specific attenuations for UL RS antenna switching more accurately. The DL-RS may be used for calculating a downlink pathloss and it can be called DL pathloss RS.

The UE applies the UL RS antenna switching resource configuration, and determines 606 one or more antenna-port-specific uplink power control values based at least partly on the one or more antenna-port-specific uplink power control target values and/or the downlink pathloss reference signal per reception antenna port associated with at least one of the plurality of UL RS antenna ports. In other words, the UE may determine the actual antenna-port-specific power control values based at least partly on the antenna-port-specific target power values (i.e. p0) indicated by the base station. When determining the actual power control value, the UE may take into account also the remaining UL TX power budget in such a way that the determined actual power control value does not exceed the available UL TX power budget per antenna port. The available UL TX power may be determined by dividing the available TX power budget per resource by the number of antenna ports. Alternatively, the base station may configure the UE via higher layer signalling with different weights that are associated with the way how the available UL TX power budget is shared with different antenna ports. For example, in the case of two antenna ports, the network may configure a weight vector, i.e. power weighting values, with two values: ¾ and ¼. Those values indicate how the UE shall share the available UL TX power budget among these two antenna ports.

The UE may measure the downlink pathloss reference signal per UE RX antenna port that is associated with a corresponding UE UL RS antenna port associated with antenna-switching. In other words, the UE may use one-to-one mapping between the RX antenna port (from which it has measured the pathloss) and a corresponding UE TX antenna port used for antenna switching.

The UE performs 607 a first UL RS transmission to the base station by applying the UL RS antenna switching configuration to the plurality of antenna ports based at least partly on the one or more antenna-port-specific repetition patterns and/or the one or more antenna-port-specific uplink power control target values. For example, the UE may transmit the first UL RS transmission from one or more antenna ports of the plurality of antenna ports at a time, and switch between the different antenna ports at different time instants according to the one or more antenna-port-specific repetition patterns.

The one or more antenna-port-specific repetition patterns may cause the UE to repeat a transmission of resource elements associated with at least one antenna port over consecutive and/or non-consecutive OFDM symbols, while transmitting the first UL RS. In order to mitigate the antenna-port-specific attenuations, the UE may apply different repetition patterns to different antenna ports independent of antenna ports associated with the same or different resource. For example, the UE may apply more repetitions for antenna port(s) that are experiencing higher attenuation.

The UE may apply the determined one or more antenna-port-specific uplink power control values to the plurality of antenna ports, while transmitting the UL RS. In order to mitigate the antenna-port-specific attenuations, the UE may apply different uplink power control values to different antenna ports. For example, the UE may increase the transmit power for antenna port(s) that are experiencing higher attenuation.

The base station may determine 608 updated parameters, i.e. one or more updated antenna-port-specific repetition patterns and/or one or more updated antenna-port-specific uplink power control target values (i.e. p0) for the plurality of antenna ports associated with the UE. For example, the base station may determine the updated parameters based on updated antenna-port-specific capability information reported by the UE, and/or one or more antenna-port-specific power headroom values reported by the UE. The base station may indicate 609 the updated parameters to the UE for example via RRC, MAC, and/or physical (PHY) layer signaling, such as DCI with specific payload bits reserved for this indication. The UE may apply 610 the updated parameters, and performs 611 a second UL RS transmission (or, updated UL RS transmission) to the base station based at least partly on the updated parameters.

Figure 7:
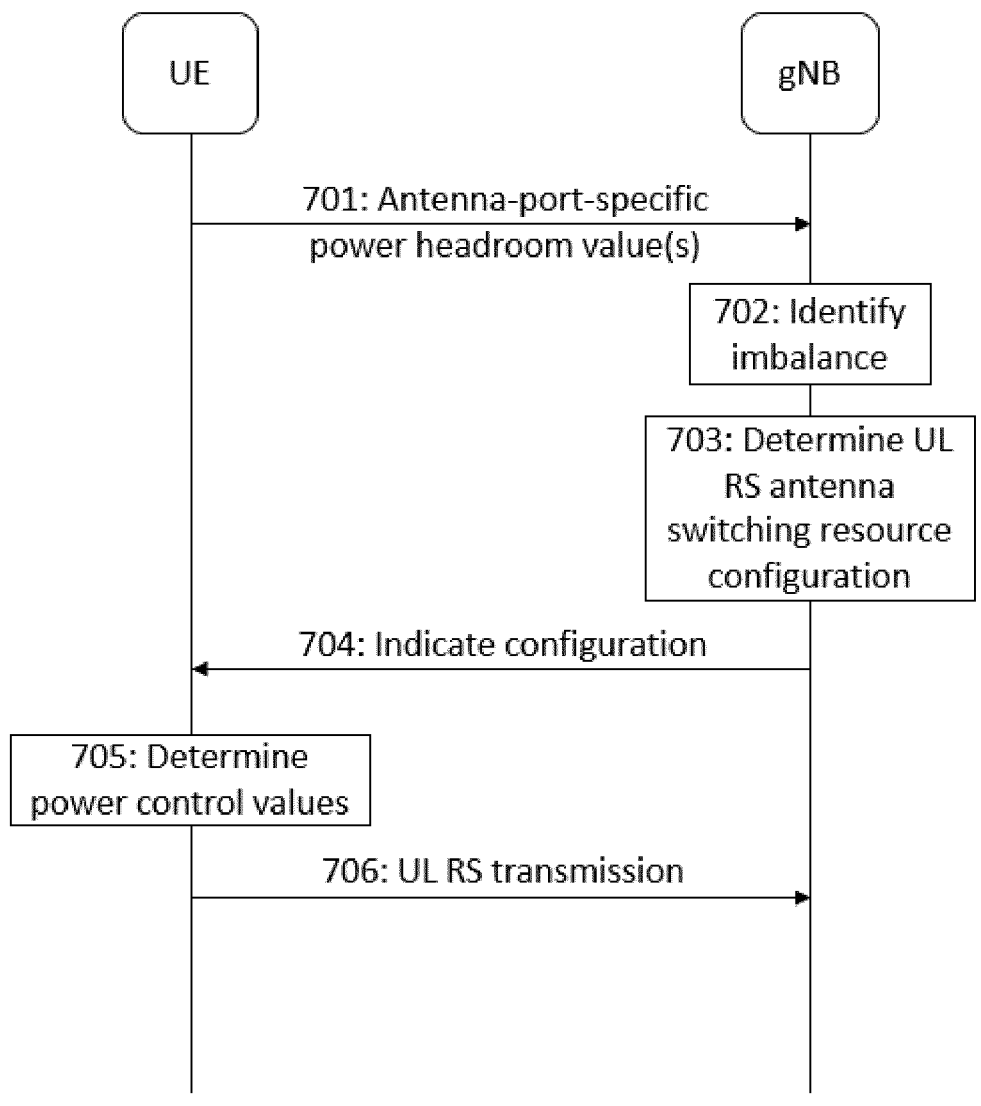

FIG. 7 illustrates a signaling diagram according to another exemplary embodiment, wherein antenna-port-specific power headroom values are used to identify the imbalance, instead of (or in addition to) using antenna-port-specific capability information as in FIG. 6.

Referring to FIG. 7, a UE transmits 701, to a base station such as a gNB, one or more antenna-port-specific power headroom values associated with a plurality of its UL RS antenna ports associated with antenna switching. The one or more antenna-port-specific power headroom values may be reported, for example, by using MAC CE transmitted via PUSCH. In other words, antenna-port-specific power headroom reporting (PHR) type 3 may be performed. It should be noted that legacy PHR type 3 is not antenna-port-specific and does not include antenna element gain. The antenna-port-specific PHR can provide valuable information to the base station about UE TX impairments.

The base station identifies 702 a power imbalance between the plurality of UL RS antenna ports associated with the UE, wherein the power imbalance is identified based at least partly on the one or more antenna-port-specific power headroom values received from the UE.

In order to obtain power balance between the plurality of UL RS antenna ports associated with the UE, the base station determines 703, based at least partly on the identified imbalance and/or the one or more antenna-port-specific power headroom values received from the UE, an UL RS antenna switching resource configuration comprising one or more antenna-port-specific repetition patterns and/or one or more antenna-port-specific uplink power control target values (i.e. p0) for the plurality of antenna ports associated with the UE. The configuration may also comprise one or more path loss compensation factors (i.e. alpha) for UL power control of the UE.

Based on the one or more antenna-port-specific power headroom values received from the UE, the base station is aware of how much TX power budget is remaining at the UE side, and the base station can configure the UE for example with antenna-port-specific repetition patterns for UL RS antenna switching. For example, if there is no power remaining for a given UL RS antenna port, the base station may configure this UL RS antenna port with repetition. As a result of this, DL CSI acquisition with UL RS antenna switching with antenna-port-specific repetition may be improved.

The base station indicates 704, to the UE, the determined UL RS antenna switching resource configuration comprising the one or more antenna-port-specific repetition patterns and/or the one or more antenna-port-specific uplink power control target values for transmitting UL RS. The configuration may be indicated, for example, via RRC signaling.

The UE applies the UL RS antenna switching resource configuration, and determines 705 one or more antenna-port-specific uplink power control values based at least partly on the one or more antenna-port-specific uplink power control target values and/or a downlink pathloss reference signal per reception antenna port associated with at least one of the plurality of antenna ports. In other words, the UE may determine the actual power control values based at least partly on the target values indicated by the base station.

The UE performs 706 an UL RS transmission to the base station by applying antenna switching to the plurality of antenna ports based at least partly on the one or more antenna-port-specific repetition patterns and/or the one or more antenna-port-specific uplink power control target values.

Table 1 below shows an example of UE TX RF impairments (i.e. attenuations) associated with UL SRS antenna switching, as well as corresponding antenna-port-specific repetitions for compensating the impairments. In Table 1, Ap is an abbreviation for antenna port, and Ant is an abbreviation for antenna.

TABLE 1

| TX path | TX attenuations | | | | |
| | TX chain gain [dB] | TX-chain-to-antenna gain [dB] | Antenna gain [dB] | Total gain [dB] | Number of repeated symbols |
|---|---|---|---|---|---|
| UL SRS Ap#0-Ant#0 | 0 | 0 | 0 | 0 | 1 |
| UL SRS Ap#1-Ant#1 | −3 | 0 | −3 | −6 | 4 |
| UL SRS Ap#2-Ant#2 | 0 | −4.5 | −9 | −13.5 | 23 |
| UL SRS Ap#3-Ant#3 | −3 | −4.5 | −9 | −16.5 | 45 |

In another exemplary embodiment, a UE-assisted joint antenna-port-specific repetition and UL power control scheme for UL RS antenna-switching may be used. In other words, the UE may autonomously determine the one or more antenna-port-specific repetition patterns, and receive the one or more antenna-port-specific uplink power control target values from the base station. When the UE is configured with UE-assisted operation, the UE is pre-configured with a set of pre-defined antenna-port-specific repetition pattern options, out of which the UE may select one antenna-portspecific repetition pattern option for a given antenna port. In the selection phase, the UE may take into account the available TX power budget per UL RS antenna port, and select an antenna-port-specific repetition pattern for a given antenna port accordingly based on the available TX power budget for that antenna port. The UE may be further configured to indicate the selected option to the base station, for example by reporting the index of the selected repetition pattern option to the base station via PUCCH or PUSCH. For example, the UE may be pre-configured with a first pre-defined antenna-port-specific repetition pattern, a second pre-defined antenna-port-specific repetition pattern, a third pre-defined antenna-port-specific repetition pattern, and a fourth pre-defined antenna-port-specific repetition pattern for a given antenna port, and the UE may select the most feasible one of these based on its available TX power budget and TX impairments.

It should be noted that some exemplary embodiments may be applied for example to an UL SRS configuration. Alternatively, some exemplary embodiments may be applied to an UL PT-RS configuration or an UL DM-RS configuration for a PUSCH and/or a PUCCH.

FIG. 8 illustrates a flow chart according to an exemplary embodiment. The functions illustrated in FIG. 8 may be performed by an apparatus such as, or comprised in, a base station (for example a gNB). Referring to FIG. 8, a power imbalance between a plurality of antenna ports associated with a UE is identified 801. Based at least partly on the identified power imbalance, one or more antenna-port-specific repetition patterns and/or one or more antenna-port-specific uplink power control target values are determined 802 for the plurality of antenna ports associated with the UE. For example, the one or more antenna-port-specific repetition patterns may comprise at least a first antenna-port-specific repetition pattern for a first antenna port of the plurality of antenna ports, and a second antenna-port-specific repetition pattern for a second antenna port of the plurality of antenna ports. For example, the one or more antenna-port-specific uplink power control target values may comprise at least a first antenna-port-specific uplink power control target value for a first antenna port of the plurality of antenna ports, and a second antenna-port-specific uplink power control target value for a second antenna port of the plurality of antenna ports. The one or more antenna-port-specific repetition patterns and/or the one or more antenna-port-specific uplink power control target values are indicated 803 to the UE to be used for transmitting an uplink reference signal. The uplink reference signal is received 804 from the UE.

FIG. 9 illustrates a flow chart according to an exemplary embodiment. The functions illustrated in FIG. 9 may be performed by an apparatus such as, or comprised in, a UE. Referring to FIG. 9, one or more antenna-port-specific repetition patterns and/or one or more antenna-port-specific uplink power control target values are obtained 901 for a plurality of antenna ports. For example, the one or more antenna-port-specific repetition patterns may comprise at least a first antenna-port-specific repetition pattern for a first antenna port of the plurality of antenna ports, and a second antenna-port-specific repetition pattern for a second antenna port of the plurality of antenna ports. For example, the one or more antenna-port-specific uplink power control target values may comprise at least a first antenna-port-specific uplink power control target value for a first antenna port of the plurality of antenna ports, and a second antenna-port-specific uplink power control target value for a second antenna port of the plurality of antenna ports. An uplink reference signal is transmitted 902 by applying antenna switching to at least a subset of the plurality of antenna ports based at least partly on the one or more antenna-port-specific repetition patterns and/or the one or more antenna-port-specific uplink power control target values.

FIG. 10 illustrates a flow chart according to another exemplary embodiment, wherein UL SRS antenna-port-specific repetition and/or antenna-port-specific UL power control is combined with frequency hopping for UL SRS antenna switching in order to address large RF impairments. The functions illustrated in FIG. 10 may be performed by an apparatus such as, or comprised in, a UE. For example, based on UL SRS antenna-switching antenna-port-specific capability reporting (e.g. according to block 601 of FIG. 6), the base station may configure UL SRS resources to the UE such that antenna-port-specific attenuations are compensated with antenna-port-specific repetition and/or UL power control, as well as frequency hopping. Referring to FIG. 10, frequency hopping is performed 1001 with or without partial frequency sounding (introduced in NR Rel-17), while transmitting an uplink reference signal (e.g. during block 607 of FIG. 6 or block 902 of FIG. 9). NR Rel-17 partial frequency sounding may enable capacity enhancement, in which SRS is transmitted in some but not all PRBs of the hopping band. In NR Rel-17 partial SRS, partial continuous PRBs may be sounded within the full band, and the unsounded PRBs can be obtained by utilizing frequency-domain channel interpolation.

The functions and/or blocks described above by means of FIGS. 6-10 are in no absolute chronological order, and some of them may be performed simultaneously or in an order differing from the described one. Other functions and/or blocks may also be executed between them or within them.

Figure 11:
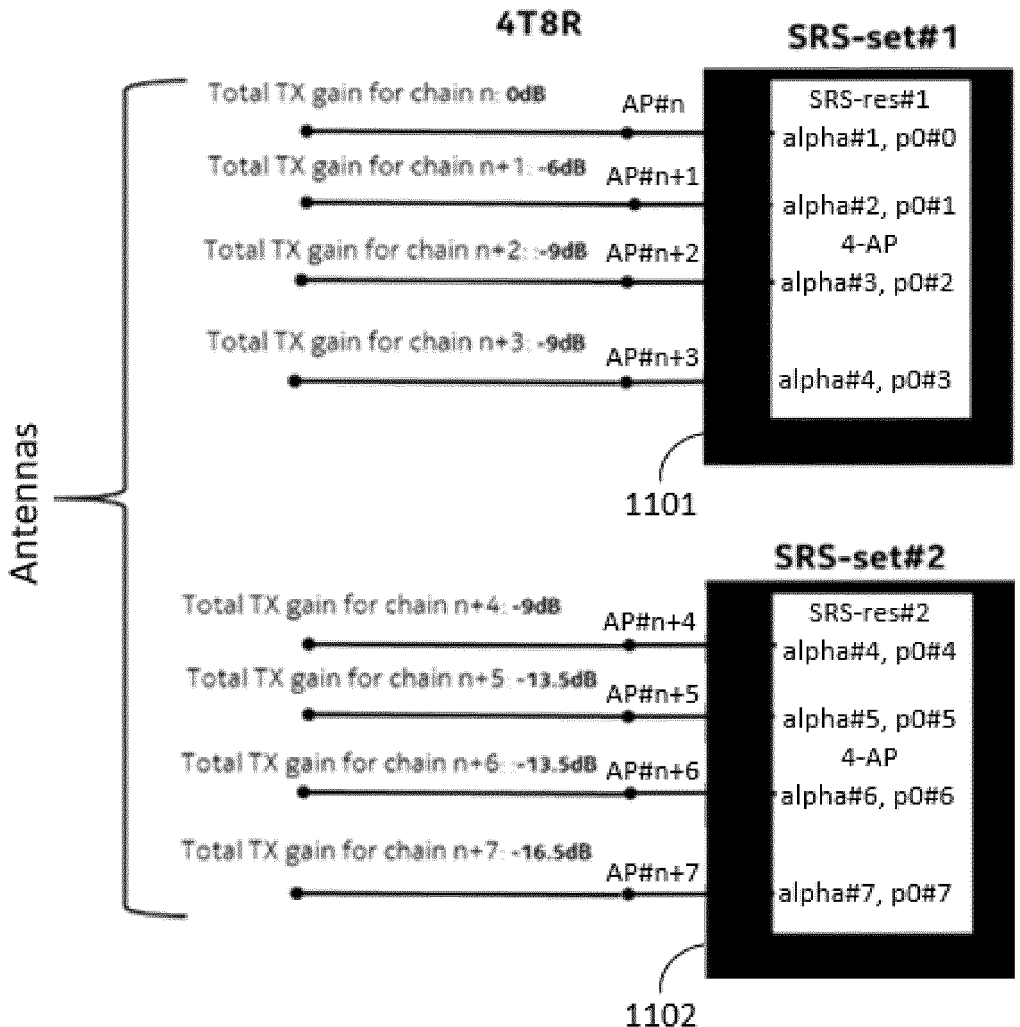
FIGS. 11-12 illustrate examples of uplink sounding reference signal antenna-switching resource set configurations.

FIG. 11 illustrates an example of an UL SRS antenna-switching resource set configuration for 4T8R comprising antenna-port-specific UL power control parameter sets 1101, 1102 (i.e. alpha and p0).

Figure 12:
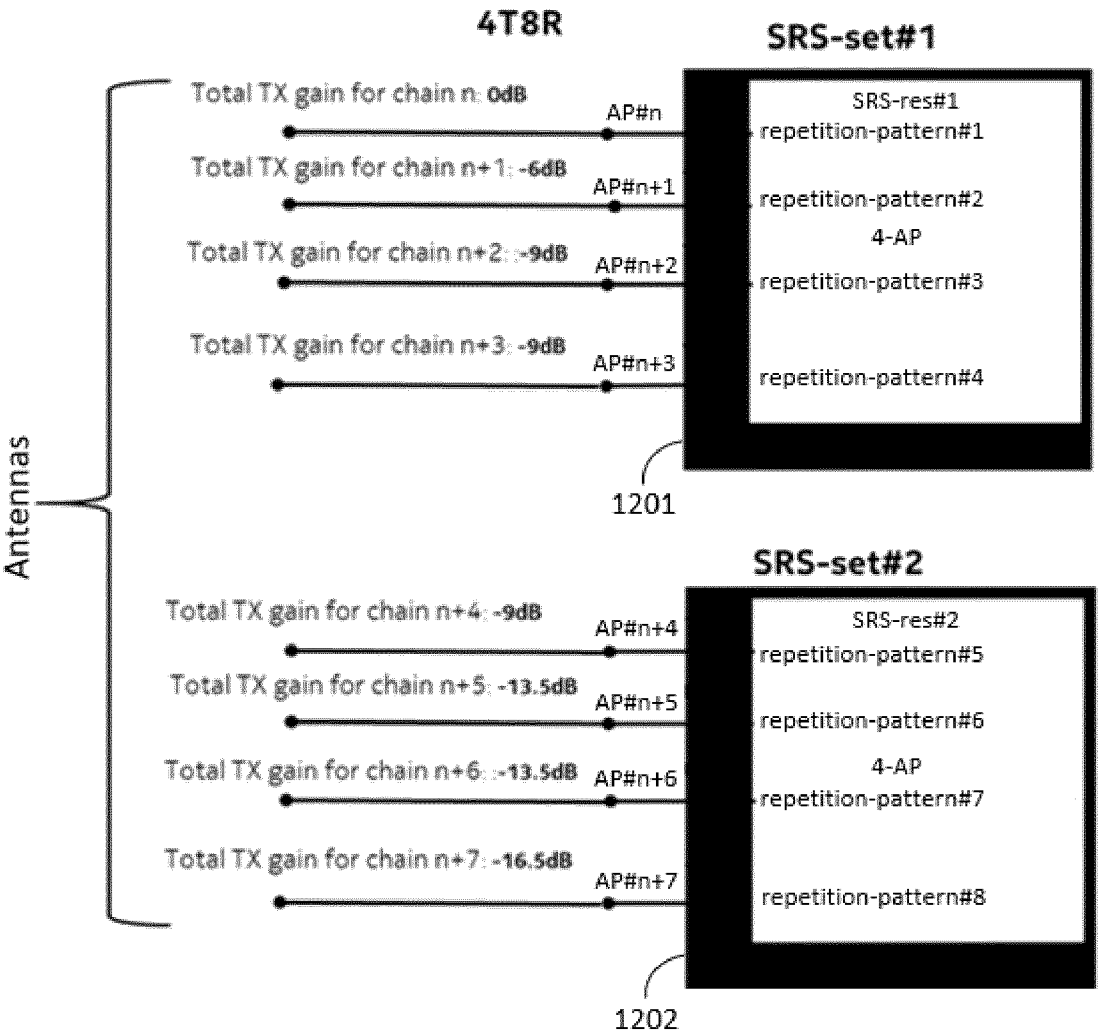

FIG. 12 illustrates an example of an UL SRS antenna-switching resource set configuration for 4T8R comprising antenna-port-specific repetition pattern sets 1201, 1202.

A technical advantage provided by some exemplary embodiments is that they enable to compensate the UE TX RF imbalance between different TX RF chains associated with UL RS antenna ports. In other words, some exemplary embodiments enable to mitigate UE TX RF chain-specific attenuations (including also TX-chain-to-antenna attenuation and antenna attenuation). As a result of this, for example the quality of DL CSI obtained via UL SRS antenna-switching may be enhanced, resulting in improved multi-user non-codebook based precoding with improved DL multi-user PDSCH system performance.

Since some exemplary embodiments enable to combine the merits of antenna-port-specific repetition and antenna-port-specific UL power control, the latency and resource overhead related to repetition may be reduced. For example, in legacy systems, due to large RF impairments associated with UL RS antenna switching, a large number of repetitions (e.g. a total of −16.5 dB=45 repetitions) may be needed, leading to a large latency and large UL RS transmission overhead. However, when combining UL RS antenna-port-specific power control with antenna-port-specific repetition according to some exemplary embodiments, the number of repetitions can be reduced significantly. For example, by allowing 3 dB more TX power for another antenna port, the number of repetitions may be reduced in half, compared to the case without antenna-port-specific power control subject to the UE TX power budget.

Furthermore, the UE-assisted operation of some exemplary embodiments enables the UE to select the most suitable antenna-port-specific repetition pattern and/or UL power control values without need for capability signaling or power headroom reporting. Therefore, the UE-assisted operation enables the UE to operate in a more autonomous manner with given conditions configured by the network. As a result of this, latency and signaling overhead may be reduced.

Figure 13:
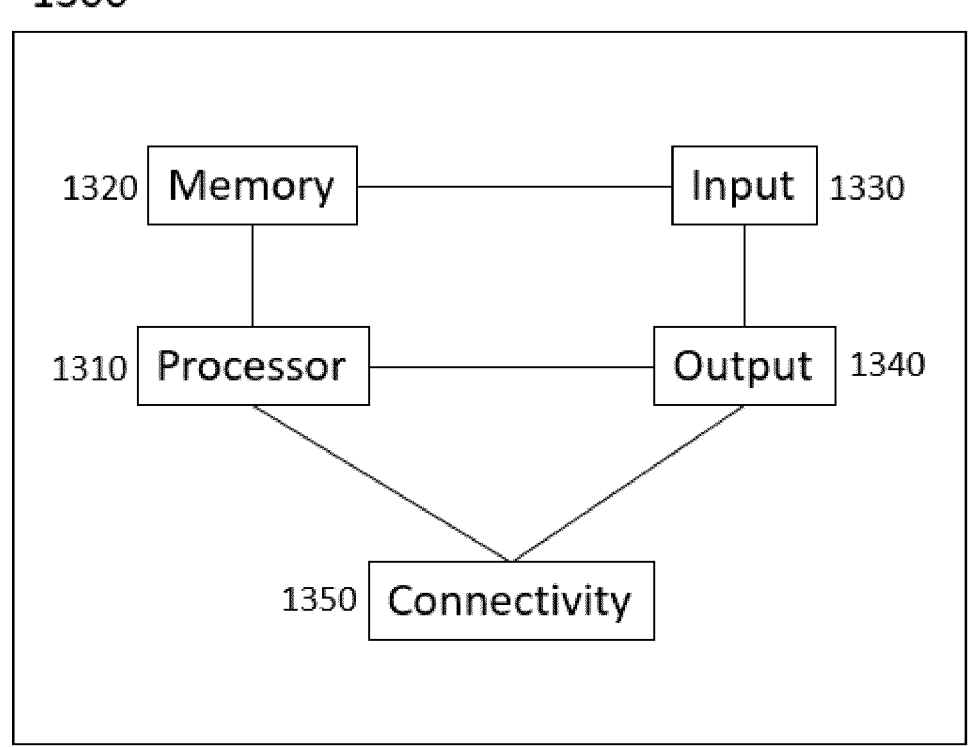
FIGS. 13-14 illustrate apparatuses according to some exemplary embodiments.

FIG. 13 illustrates an apparatus 1300, which may be an apparatus such as, or comprised in, a terminal device, according to an exemplary embodiment. A terminal device may also be referred to as a UE or user equipment herein. The apparatus 1300 comprises a processor 1310. The processor 1310 interprets computer program instructions and processes data. The processor 1310 may comprise one or more programmable processors. The processor 1310 may comprise programmable hardware with embedded firmware and may, alternatively or additionally, comprise one or more application-specific integrated circuits (ASICs).

The processor 1310 is coupled to a memory 1320. The processor is configured to read and write data to and from the memory 1320. The memory 1320 may comprise one or more memory units. The memory units may be volatile or non-volatile. It is to be noted that in some exemplary embodiments there may be one or more units of non-volatile memory and one or more units of volatile memory or, alternatively, one or more units of non-volatile memory, or, alternatively, one or more units of volatile memory. Volatile memory may be for example random-access memory (RAM), dynamic random-access memory (DRAM) or synchronous dynamic random-access memory (SDRAM). Non-volatile memory may be for example read-only memory (ROM), programmable read-only memory (PROM), electronically erasable programmable read-only memory (EEPROM), flash memory, optical storage or magnetic storage. In general, memories may be referred to as non-transitory computer readable media. The memory 1320 stores computer readable instructions that are executed by the processor 1310. For example, non-volatile memory stores the computer readable instructions and the processor 1310 executes the instructions using volatile memory for temporary storage of data and/or instructions.

The computer readable instructions may have been pre-stored to the memory 1320 or, alternatively or additionally, they may be received, by the apparatus, via an electromagnetic carrier signal and/or may be copied from a physical entity such as a computer program product. Execution of the computer readable instructions causes the apparatus 1300 to perform one or more of the functionalities described above.

In the context of this document, a "memory" or "computer-readable media" or "computer-readable medium" may be any non-transitory media or medium or means that can contain, store, communicate, propagate or transport the instructions for use by or in connection with an instruction execution system, apparatus, or device, such as a computer.

The apparatus 1300 may further comprise, or be connected to, an input unit 1330. The input unit 1330 may comprise one or more interfaces for receiving input. The one or more interfaces may comprise for example one or more temperature, motion and/or orientation sensors, one or more cameras, one or more accelerometers, one or more microphones, one or more buttons and/or one or more touch detection units. Further, the input unit 1330 may comprise an interface to which external devices may connect to.

The apparatus 1300 may also comprise an output unit 1340. The output unit may comprise or be connected to one or more displays capable of rendering visual content, such as a light emitting diode (LED) display, a liquid crystal display (LCD) and/or a liquid crystal on silicon (LCoS) display. The output unit 1340 may further comprise one or more audio outputs. The one or more audio outputs may be for example loudspeakers.

The apparatus 1300 further comprises a connectivity unit 1350. The connectivity unit 1350 enables wireless connectivity to one or more external devices. The connectivity unit 1350 comprises at least one transmitter and at least one receiver that may be integrated to the apparatus 1300 or that the apparatus 1300 may be connected to. The at least one transmitter comprises at least one transmission antenna, and the at least one receiver comprises at least one receiving antenna. The connectivity unit 1350 may comprise an integrated circuit or a set of integrated circuits that provide the wireless communication capability for the apparatus 1300. Alternatively, the wireless connectivity may be a hardwired application-specific integrated circuit (ASIC). The connectivity unit 1350 may comprise one or more components such as a power amplifier, digital front end (DFE), analog-to-digital converter (ADC), digital-to-analog converter (DAC), frequency converter, (de)modulator, and/or encoder/decoder circuitries, controlled by the corresponding controlling units.

It is to be noted that the apparatus 1300 may further comprise various components not illustrated in FIG. 13. The various components may be hardware components and/or software components.

Figure 14:
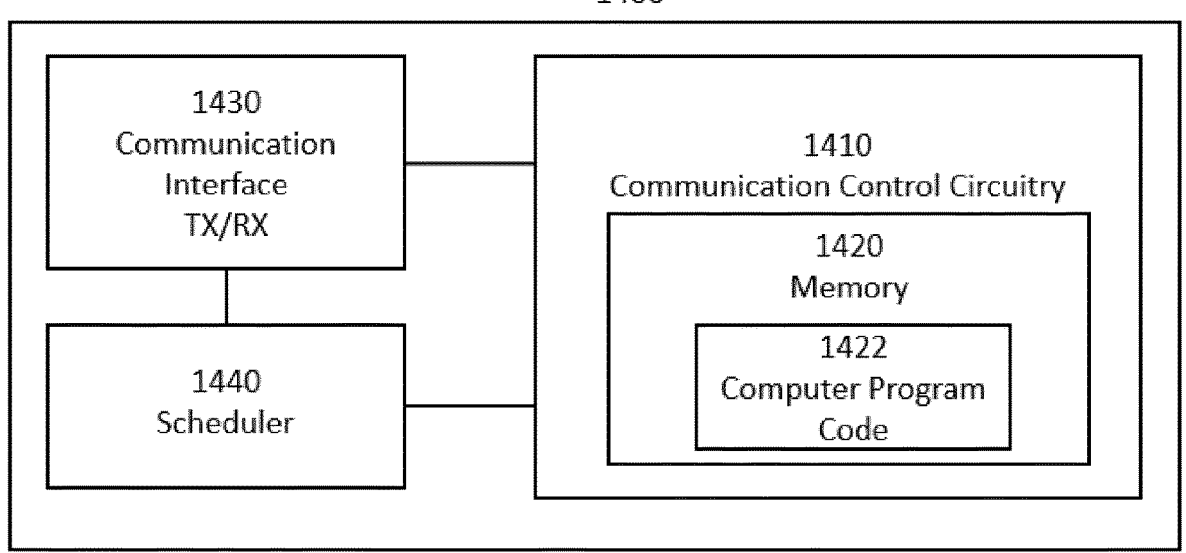

The apparatus 1400 of FIG. 14 illustrates an exemplary embodiment of an apparatus such as, or comprised in, a base station such as a gNB. The apparatus may comprise, for example, a circuitry or a chipset applicable to a base station for realizing some of the described exemplary embodiments. The apparatus 1400 may be an electronic device comprising one or more electronic circuitries. The apparatus 1400 may comprise a communication control circuitry 1410 such as at least one processor, and at least one memory 1420 including a computer program code (software) 1422 wherein the at least one memory and the computer program code (software) 1422 are configured, with the at least one processor, to cause the apparatus 1400 to carry out some of the exemplary embodiments described above.

The processor is coupled to the memory 1420. The processor is configured to read and write data to and from the memory 1420. The memory 1420 may comprise one or more memory units. The memory units may be volatile or non-volatile. It is to be noted that in some exemplary embodiments there may be one or more units of non-volatile memory and one or more units of volatile memory or, alternatively, one or more units of non-volatile memory, or, alternatively, one or more units of volatile memory. Volatile memory may be for example random-access memory (RAM), dynamic random-access memory (DRAM) or synchronous dynamic random-access memory (SDRAM). Non-volatile memory may be for example read-only memory (ROM), programmable read-only memory (PROM), electronically erasable programmable read-only memory (EEPROM), flash memory, optical storage or magnetic storage. In general, memories may be referred to as non-transitory computer readable media. The memory 1420 stores computer readable instructions that are executed by the processor. For example, non-volatile memory stores the computer readable instructions and the processor executes the instructions using volatile memory for temporary storage of data and/or instructions.

The computer readable instructions may have been pre-stored to the memory 1420 or, alternatively or additionally, they may be received, by the apparatus, via an electromagnetic carrier signal and/or may be copied from a physical entity such as a computer program product. Execution of the computer readable instructions causes the apparatus 1400 to perform one or more of the functionalities described above.

The memory 1420 may be implemented using any suitable data storage technology, such as semiconductor-based memory devices, flash memory, magnetic memory devices and systems, optical memory devices and systems, fixed memory and/or removable memory. The memory may comprise a configuration database for storing configuration data. For example, the configuration database may store a current neighbour cell list, and, in some exemplary embodiments, structures of the frames used in the detected neighbour cells.

The apparatus 1400 may further comprise a communication interface 1430 comprising hardware and/or software for realizing communication connectivity according to one or more communication protocols. The communication interface 1430 comprises at least one transmitter (TX) and at least one receiver (RX) that may be integrated to the apparatus 1400 or that the apparatus 1400 may be connected to. The communication interface 1430 provides the apparatus with radio communication capabilities to communicate in the cellular communication system. The communication interface may, for example, provide a radio interface to terminal devices. The apparatus 1400 may further comprise another interface towards a core network such as the network coordinator apparatus and/or to the access nodes of the cellular communication system. The apparatus 1400 may further comprise a scheduler 1440 that is configured to allocate resources.

As used in this application, the term "circuitry" may refer to one or more or all of the following: a) hardware-only circuit implementations (such as implementations in only analog and/or digital circuitry); and b) combinations of hardware circuits and software, such as (as applicable): i) a combination of analog and/or digital hardware circuit(s) with software/firmware and ii) any portions of hardware processor(s) with software (including digital signal processor(s)), software, and memory(ies) that work together to cause an apparatus, such as a mobile phone, to perform various functions); and c) hardware circuit(s) and/or processor(s), such as a microprocessor(s) or a portion of a microprocessor(s), that requires software (for example firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

The techniques and methods described herein may be implemented by various means. For example, these techniques may be implemented in hardware (one or more devices), firmware (one or more devices), software (one or more modules), or combinations thereof. For a hardware implementation, the apparatus(es) of exemplary embodiments may be implemented within one or more application-specific integrated circuits (ASICs), digital signal processors (DSPs), digital signal processing devices (DSPDs), programmable logic devices (PLDs), field programmable gate arrays (FPGAs), graphics processing units (GPUs), processors, controllers, micro-controllers, microprocessors, other electronic units designed to perform the functions described herein, or a combination thereof. For firmware or software, the implementation can be carried out through modules of at least one chipset (for example procedures, functions, and so on) that perform the functions described herein. The software codes may be stored in a memory unit and executed by processors. The memory unit may be implemented within the processor or externally to the processor. In the latter case, it can be communicatively coupled to the processor via various means, as is known in the art. Additionally, the components of the systems described herein may be rearranged and/or complemented by additional components in order to facilitate the achievements of the various aspects, etc., described with regard thereto, and they are not limited to the precise configurations set forth in the given figures, as will be appreciated by one skilled in the art.

It will be obvious to a person skilled in the art that, as technology advances, the inventive concept may be implemented in various ways. The embodiments are not limited to the exemplary embodiments described above, but may vary within the scope of the claims. Therefore, all words and expressions should be interpreted broadly, and they are intended to illustrate, not to restrict, the exemplary embodiments.

The invention claimed is:

1. An apparatus comprising:

at least one processor; and at least one memory including instructions, which when executed by the at least one processor, cause the apparatus to:

obtain one or more antenna-port-specific repetition patterns and one or more antenna-port-specific uplink power control target values for a plurality of antenna ports;

transmit an uplink reference signal by applying antenna switching to at least a subset of the plurality of antenna ports based at least partly on the one or more antenna-port-specific repetition patterns and the one or more antenna-port-specific uplink power control target values, wherein the one or more antenna-port-specific repetition patterns cause the apparatus to repeat a transmission of resource elements associated with at least one antenna port of the plurality of antenna ports over consecutive and non-consecutive symbols, while transmitting the uplink reference signal;

determine one or more antenna-port-specific uplink power control values based at least partly on the one or more antenna-port-specific uplink power control target values and a downlink reference signal per reception antenna port associated with a corresponding antenna port of the plurality of antenna ports, wherein the determined one or more antenna-port-specific uplink power control values are applied to one or more antenna ports of the plurality of antenna ports, while transmitting the uplink reference signal; and update the one or more antenna-port-specific repetition patterns and the one or more antenna-port-specific uplink power control target values before transmitting the uplink reference signal, wherein the uplink reference signal is transmitted based at least partly on the updated one or more antenna-port-specific repetition patterns and the updated one or more antenna-port-specific uplink power control target values.

* * * * *